US010785237B2

(12) United States Patent
Mestha et al.

(10) Patent No.: US 10,785,237 B2
(45) Date of Patent: Sep. 22, 2020

(54) LEARNING METHOD AND SYSTEM FOR SEPARATING INDEPENDENT AND DEPENDENT ATTACKS

(71) Applicant: General Electric Company, Schenectady, NY (US)

(72) Inventors: Lalit Keshav Mestha, North Colonie, NY (US); Masoud Abbaszadeh, Clifton Park, NY (US); Annarita Giani, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 313 days.

(21) Appl. No.: 15/977,558

(22) Filed: May 11, 2018

(65) Prior Publication Data

US 2019/0230099 A1 Jul. 25, 2019

Related U.S. Application Data

(60) Provisional application No. 62/619,366, filed on Jan. 19, 2018.

(51) Int. Cl.
*H04L 29/06* (2006.01)
*G06N 7/00* (2006.01)
*G06K 9/62* (2006.01)

(52) U.S. Cl.
CPC ......... *H04L 63/1416* (2013.01); *G06N 7/005* (2013.01); *H04L 63/1425* (2013.01); *H04L 63/1441* (2013.01); *G06K 9/6217* (2013.01)

(58) Field of Classification Search
CPC ............. H04L 63/1416; H04L 63/1425; H04L 63/1441; G06N 7/005; G06K 9/6217
(Continued)

(56) References Cited

U.S. PATENT DOCUMENTS 4,455,614 A * 6/1984 Martz ................. F01K 23/10
290/40 R
5,661,668 A * 8/1997 Yemini ............... G06F 11/2257
702/186
(Continued)

FOREIGN PATENT DOCUMENTS

CA      2927826 A1    10/2017
CN      104123500 A * 10/2014 ........... G06F 21/562
WO   2017171639 A1   10/2017

OTHER PUBLICATIONS

Servin, Arturo et al., "Multi-agent Reinforcement Learning for Intrusion Detection", Adaptive Agents and Multi-Agents Systems, 2007, https://www.semanticscholar.org/paper/Multi-agent-Reinforcement-Learning-for-Intrusion-D-Servin-Kudenko/6e70dc2828b47292381fdca4le4362c5fe92818d, (pp. 211-223, 13 total pages).
(Continued)

Primary Examiner — Shahriar Zarrineh
(74) Attorney, Agent, or Firm — Buckley, Maschoff & Talwalkar LLC

(57) ABSTRACT

Streams of monitoring node signal values over time, representing a current operation of the industrial asset, are used to generate current monitoring node feature vectors. Each feature vector is compared with a corresponding decision boundary separating normal from abnormal states. When a first monitoring node passes a corresponding decision boundary, an attack is detected and classified as an independent attack. When a second monitoring node passes a decision boundary, an attack is detected and a first decision is generated based on a first set of inputs indicating if the attack is independent/dependent. From the beginning of the attack on the second monitoring node until a final time, the first decision is updated as new signal values are received for the second monitoring node. When the final time is reached,
(Continued)

a second decision is generated based on a second set of inputs indicating if the attack is independent/dependent.

15 Claims, 23 Drawing Sheets

(58) Field of Classification Search
USPC .......................................................... 726/22
See application file for complete search history.

(56) References Cited

U.S. PATENT DOCUMENTS

| | | | | |
|---|---|---|---|---|
| 8,191,136 B2* | 5/2012 | Dudfield | ............. | H04L 41/0893 709/224 |
| 8,468,244 B2* | 6/2013 | Redlich | ................. | G06Q 10/06 709/225 |
| 8,756,047 B2* | 6/2014 | Patel | ........................ | H02J 3/06 703/18 |
| 8,973,124 B2* | 3/2015 | Chong | ................. | G05B 19/414 726/10 |
| 9,405,900 B2* | 8/2016 | Dixit | ....................... | G06F 21/55 |
| 10,204,226 B2* | 2/2019 | Bushey | ................... | G06F 21/57 |
| 10,205,733 B1* | 2/2019 | Park | .................... | H04L 63/1408 |
| 10,397,257 B2* | 8/2019 | Holzhauer | .............. | H04L 67/10 |
| 10,417,415 B2* | 9/2019 | Abbaszadeh | ....... | H04L 63/1425 |
| 10,476,902 B2* | 11/2019 | Holzhauer | .......... | H04L 63/1425 |
| 10,594,712 B2* | 3/2020 | Mestha | ................. | G06N 20/00 |
| 2002/0032717 A1* | 3/2002 | Malan | ..................... | H04L 43/00 718/105 |
| 2003/0074439 A1* | 4/2003 | Grabarnik | ............... | H04L 41/16 709/224 |
| 2006/0069955 A1* | 3/2006 | Oka | ...................... | G06F 21/316 714/25 |
| 2008/0201397 A1* | 8/2008 | Peng | .................. | G06Q 10/0639 708/308 |
| 2012/0233127 A1* | 9/2012 | Solmer | ............... | G06F 16/3347 707/661 |
| 2013/0132149 A1* | 5/2013 | Wei | .................... | G05B 23/0281 705/7.28 |
| 2013/0291115 A1* | 10/2013 | Chong | .................... | H04L 67/12 726/25 |
| 2014/0223562 A1 | 8/2014 | Liu | | |
| 2014/0244192 A1* | 8/2014 | Craig | ..................... | G01R 21/06 702/62 |
| 2014/0283047 A1* | 9/2014 | Dixit | .................. | H04L 63/1425 726/23 |
| 2014/0298399 A1* | 10/2014 | Heo | .................... | H04L 63/1416 726/1 |
| 2015/0149174 A1* | 5/2015 | Gollan | .................... | G10L 17/06 704/246 |
| 2015/0254555 A1* | 9/2015 | Williams, Jr. | ........ | G06N 3/0454 706/14 |
| 2015/0346706 A1* | 12/2015 | Gendelman | .......... | G05B 19/058 700/79 |
| 2015/0381649 A1* | 12/2015 | Schultz | .................. | G06Q 40/08 726/25 |
| 2016/0033941 A1* | 2/2016 | T | ........................ | G05B 19/0428 700/81 |
| 2016/0048741 A1* | 2/2016 | Nguyen | ............. | G06K 9/00624 382/159 |
| 2016/0127931 A1* | 5/2016 | Baxley | .................. | G01S 5/0263 455/67.16 |
| 2016/0156652 A1 | 6/2016 | Paffenroth et al. | | |
| 2016/0307566 A1* | 10/2016 | Bellegarda | .......... | G06N 3/0454 |
| 2016/0328654 A1* | 11/2016 | Bauer | .................... | G06N 5/048 |
| 2016/0341636 A1* | 11/2016 | Rajaram | ................ | G06Q 50/06 |
| 2017/0034187 A1 | 2/2017 | Honig et al. | | |
| 2017/0054751 A1* | 2/2017 | Schneider | ........... | H04L 63/1425 |
| 2017/0085539 A1 | 3/2017 | Wishard et al. | | |
| 2017/0142133 A1* | 5/2017 | Kallos | ................. | H04L 63/1408 |
| 2017/0230391 A1* | 8/2017 | Ferguson | ............... | G06N 5/022 |
| 2017/0230401 A1 | 8/2017 | Ahmed et al. | | |
| 2017/0279833 A1* | 9/2017 | Vasseur | ............... | H04L 63/1425 |
| 2017/0359366 A1* | 12/2017 | Bushey | ............... | H04L 63/1408 |
| 2018/0115561 A1* | 4/2018 | Sun | ........................ | H02J 3/00 |
| 2018/0137277 A1* | 5/2018 | Mestha | ............. | G05B 23/0227 |
| 2018/0157831 A1* | 6/2018 | Abbaszadeh | .......... | G06N 20/00 |
| 2018/0159877 A1* | 6/2018 | Holzhauer | .......... | H04L 63/1441 |
| 2018/0159879 A1* | 6/2018 | Mestha | .................. | G06N 20/00 |
| 2018/0191758 A1* | 7/2018 | Abbaszadeh | ........ | G06K 9/6227 |
| 2018/0276375 A1* | 9/2018 | Arov | ..................... | G06F 21/552 |

OTHER PUBLICATIONS

Ridiga, Goverdhan Reddy et al., "Machine Learning Approach to Anomaly Detection IN Cyber Security with A Case Study of Spamming Attack", International Journal of Computer Engineering and Technology (IJCET), ISSN: 0976-6367 (Print), ISSN 0976-6375 (Online), vol. 4, Issue 3, May-Jun. 2013, (pp. 113-122, 10 total pages).

Yucelen, Tansel et al., "Adaptive Control Architectures for Mitigating Sensor Attacks in Cyber-Physical Systems", Cyber-Physical Systems, vol. 2, Issue 1-4, 2016, 6pgs.

* cited by examiner

LEARNING METHOD AND SYSTEM FOR SEPARATING INDEPENDENT AND DEPENDENT ATTACKS

CROSS-REFERENCE TO RELATED APPLICATIONS

The present application claims the benefit of U.S. Provisional Patent Application No. 62/619,366 entitled "LEARNING METHOD AND SYSTEM FOR SEPARATING INDEPENDENT AND DEPENDENT ATTACKS" and filed on Jan. 19, 2018. The entre content of that application is incorporated herein by reference.

This invention was made with Government support under contract number DE-OE0000833 awarded by the Department of Energy. The Government has certain right in this invention.

BACKGROUND

Industrial asset control systems that operate physical systems (e.g., associated with power turbines, jet engines, locomotives, autonomous vehicles, etc.) are increasingly connected to the Internet. As a result, these control systems may be vulnerable to threats, such as cyber-attacks (e.g., associated with a computer virus, malicious software, etc.), that could disrupt electric power generation and distribution, damage engines, inflict vehicle malfunctions, etc. Current methods primarily consider threat detection in Information Technology ("IT," such as, computers that store, retrieve, transmit, manipulate data) and Operation Technology ("OT," such as direct monitoring devices and communication bus interfaces). Cyber-threats can still penetrate through these protection layers and reach the physical "domain" as seen in 2010 with the Stuxnet attack. Such attacks can diminish the performance of an industrial asset and may cause a total shut down or even catastrophic damage to a plant. Currently, Fault Detection Isolation and Accommodation ("FDIA") approaches only analyze sensor data, but a threat might occur even in other types of threat monitoring nodes such as actuators, control logical(s), etc. Also note that FDIA is limited only to naturally occurring faults in one sensor at a time. FDIA systems do not address multiple simultaneously occurring abnormalities since they are normally due to malicious intent. Moreover, understanding and/or responding to threats in an industrial asset may depend at least in part on whether an attack is independent (e.g., new and unrelated to any other attack) or dependent attack (e.g., a result of an independent attack on other nodes appearing as an attack on the node under consideration due to feedback). Making this determination, however, can be a difficult task. It would therefore be desirable to protect an industrial asset from malicious intent, such as cyber-attacks, in an automatic and accurate manner.

SUMMARY

According to some embodiments, streams of monitoring node signal values over time, representing a current operation of the industrial asset, are used to generate current monitoring node feature vectors. Each feature vector is compared with a corresponding decision boundary separating normal from abnormal states. When a first monitoring node passes a corresponding decision boundary, an attack is detected and classified as an independent attack. When a second monitoring node passes a decision boundary, an attack is detected and a first decision is generated based on a first set of inputs indicating if the attack is independent or dependent. From the beginning of the attack on the second monitoring node until a final time, the first decision is updated as new signal values are received for the second monitoring node. When the final time is reached, a second decision is generated based on a second set of inputs indicating if the attack is independent or dependent.

Some embodiments comprise: means for receiving, at a threat detection computer platform, a plurality of real-time monitoring node signal values over time that represent a current operation of the industrial asset; for each stream of monitoring node signal values, means for generating, by the threat detection computer platform, a current monitoring node feature vector; means for generating each feature vector with a corresponding decision boundary for that monitoring node, the decision boundary separating a normal state from an abnormal state for that monitoring node; means for detecting that a first monitoring node has passed a corresponding decision boundary and classifying the first monitoring node as being under independent attack; means for detecting that a second monitoring node has passed the corresponding decision boundary and classifying the second monitoring node as being under attack; means for automatically generating a first decision, based on a first set of inputs, to indicate that the attack on the second monitoring node is an independent attack or a dependent attack; from the beginning of the attack on the second monitoring node until a final time is reached, means for updating the first decision as new signal values are received for the second monitoring node; when the final time is reached, means for automatically generating a second decision, based on a second set of inputs not identical to the first set of inputs, to indicate that the attack on the second monitoring node is an independent attack or dependent attack; and means for outputting information associated with at least one of the first and second decisions.

Some technical advantages of some embodiments disclosed herein are improved systems and methods to protect an industrial asset from malicious intent such as cyber threats in an automatic and accurate manner.

As used herein, the term "attack" might refer to a malicious activity that was intelligently designed as well as to situations that arise naturally, such as an equipment fault or failure.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
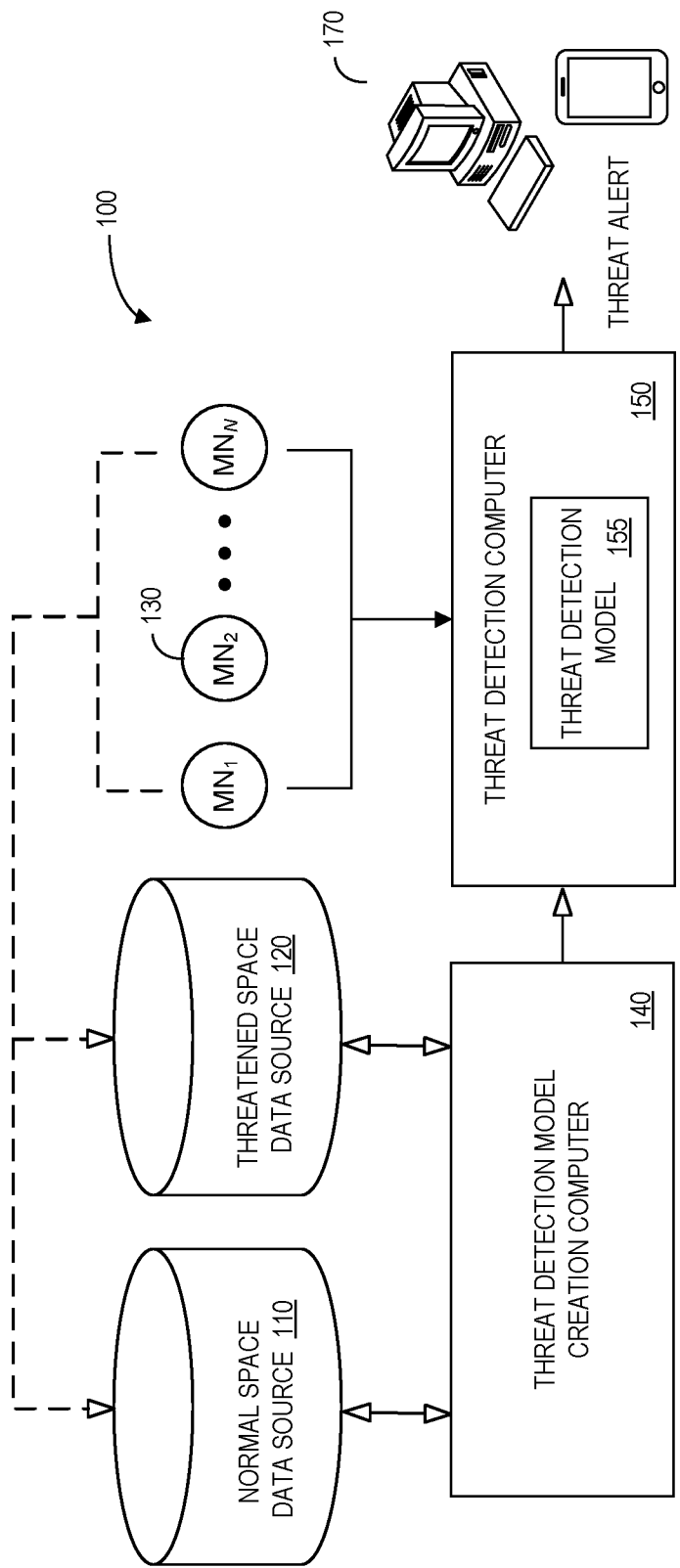
FIG. 1 is a high-level block diagram of a system that may be provided in accordance with some embodiments.

Industrial control systems that operate physical systems are increasingly connected to the Internet. As a result, these control systems may be vulnerable to threats and, in some cases, multiple attacks may occur simultaneously. Existing approaches to protect an industrial asset, such as FDIA approaches, may not adequately address these threats—especially when multiple, simultaneous attacks occur. It would therefore be desirable to protect an industrial asset from cyber threats in an automatic and accurate manner. FIG. 1 is a high-level architecture of a system 100 in accordance with some embodiments. The system 100 may include a "normal space" data source 110 and a "threatened space" data source 120. The normal space data source 110 might store, for each of a plurality of "monitoring nodes" 130 (shown in FIG. 1 as "$MN_1$," "$MN_2$," . . . , "$MN_N$" for "1, 2, . . . , N" different monitoring nodes), a series of normal values over time that represent normal operation of an industrial asset (e.g., generated by a model or collected from actual monitoring node 130 data as illustrated by the dashed line in FIG. 1). As used herein, the phrase "monitoring node" might refer to, for example, sensor data, signals sent to actuators, motors, pumps, and auxiliary equipment, intermediary parameters that are not direct sensor signals not the signals sent to auxiliary equipment, and/or control logical(s). These may represent, for example, threat monitoring nodes that receive data from the threat monitoring system in a continuous fashion in the form of continuous signals or streams of data or combinations thereof. Moreover, the nodes may be used to monitor occurrences of cyber-threats or abnormal events. This data path may be designated specifically with encryptions or other protection mechanisms so that the information may be secured and cannot be tampered with via cyber-attacks. The threatened space data source 120 might store, for each of the monitoring nodes 130, a series of threatened values that represent a threatened operation of the industrial asset (e.g., when the system is experiencing a cyber-attack).

Information from the normal space data source 110 and the threatened space data source 120 may be provided to a threat detection model creation computer 140 that uses this data to create a decision boundary (that is, a boundary that separates normal behavior from threatened behavior). The decision boundary may then be used by a threat detection computer 150 executing a threat detection model 155. The threat detection model 155 may, for example, monitor streams of data from the monitoring nodes 130 comprising data from sensor nodes, actuator nodes, and/or any other critical monitoring nodes (e.g., monitoring nodes $MN_1$ through $MN_N$), calculate at least one "feature" for each monitoring node based on the received data, and "automatically" output a threat alert signal to one or more remote monitoring devices 170 when appropriate (e.g., for display to a user). According to some embodiments, a threat alert signal might be transmitted to a unit controller, a plant Human-Machine Interface ("HMI"), or to a customer via a number of different transmission methods. Note that one receiver of a threat alert signal might be a cloud database that correlates multiple attacks on a wide range of plant assets. As used herein, the term "feature" may refer to, for example, mathematical characterizations of data. Examples of features as applied to data might include the maximum, minimum, mean, standard deviation, variance, range, current value, settling time, Fast Fourier Transform ("FFT") spectral components, linear and non-linear principal components, independent components, sparse coding features, deep learning features, etc. Moreover, term "automatically" may refer to, for example, actions that can be performed with little or no human intervention. According to some embodiments, information about a detected threat may be transmitted back to the industrial asset.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The threat detection model creation computer 140 may store information into and/or retrieve information from various data sources, such as the normal space data source 110 and/or the threatened space data source 120. The various data sources may be locally stored or reside remote from the threat detection model creation computer 140 (which might be associated with, for example, offline or online learning). Although a single threat detection model creation computer 140 is shown in FIG. 1, any number of such devices may be included. Moreover, various devices described herein might be combined according to embodiments of the present invention. For example, in some embodiments, the threat detection model creation computer 140 and one or more data sources 110, 120 might comprise a single apparatus. The threat detection model creation computer 140 functions may be performed by a constellation of networked apparatuses, in a distributed processing or cloud-based architecture.

A user may access the system 100 via one of the monitoring devices 170 (e.g., a Personal Computer ("PC"), tablet, smartphone, or remotely through a remote gateway connection) to view information about and/or manage threat information in accordance with any of the embodiments described herein. In some cases, an interactive graphical display interface may let a user define and/or adjust certain parameters (e.g., threat detection trigger levels) and/or provide or receive automatically generated recommendations or results from the threat detection model creation computer 140 and/or threat detection computer 150.

Figure 2:
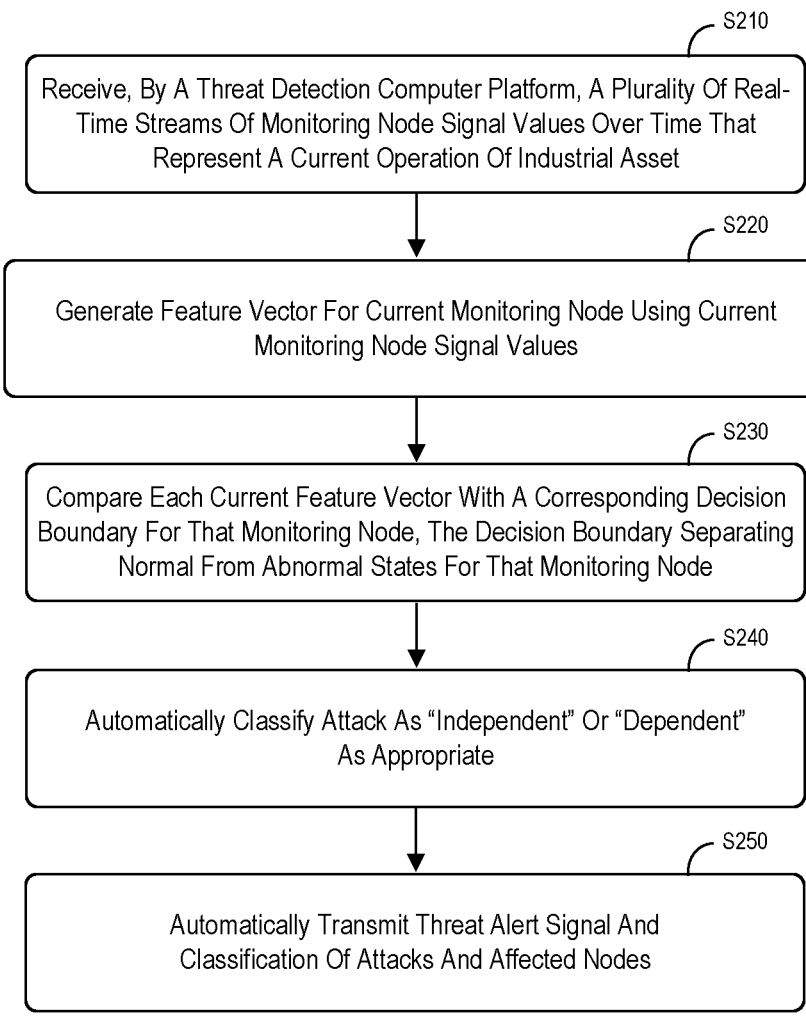
FIG. 2 is a method according to some embodiments.

For example, FIG. 2 illustrates a method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a plurality of real-time monitoring node signal inputs may receive streams of monitoring node signal values over time that represent a current operation of an industrial asset. At least one of the monitoring nodes (e.g., control nodes, etc.) may be associated with, for example, sensor data, an auxiliary equipment input signal, a control intermediary parameter, valves, circuit breakers, and/or a control logic value.

At S220, a threat detection computer platform may receive the streams of monitoring node signal values and, for each stream of monitoring node signal values, generate a feature vector for the current monitoring node using the current monitoring node signal values. Note that generation of the feature vector may include processing via one of feature transforms, identity transforms, and feature-based dynamic models. According to some embodiments, at least one of the current monitoring node feature vectors is associated with principal components, statistical features, deep learning features, frequency domain features, time series analysis features, logical features, geographic or position based locations, and/or interaction features.

At S230, each generated current monitoring node feature vector may be compared to a corresponding decision boundary (e.g., a linear boundary, non-linear boundary, multi-dimensional boundary, etc.) for that monitoring node, the decision boundary separating a normal state from an abnormal state for that monitoring node. According to some embodiments, at least one monitoring node is associated with a plurality of multi-dimensional decision boundaries and the comparison at S230 is performed in connection with each of those boundaries. Note that a decision boundary might be generated, for example, in accordance with a feature-based learning algorithm and a high-fidelity model or a normal operation of the industrial asset. Moreover, at least one decision boundary may exist in a multi-dimensional space and be associated with a dynamic model which is constructed using data obtained from design of experiments such as, a full factorial design, Taguchi screening design, a central composite methodology, a Box-Behnken methodology, and a real-world operating conditions methodology. In addition, a threat detection model associated with a decision boundary might, according to some embodiments, be dynamically obtained and adapted based on a transient condition, a steady state model of the industrial asset, and/or data sets obtained while operating the system as in self-learning systems from incoming data stream.

At S240, an attack identified at S230 may be classified as either an "independent attack" or "dependent attack" in accordance with any of the embodiments described herein. For example, the classification might be based on a causal dependency test, a propagation path fulfillment test, and/or a time separation test, etc. as described with respect to FIG. 12. At S250, the system may automatically transmit a threat alert signal (e.g., a notification message, etc.) based on results of the comparisons performed at S230 along with a classification of the attack (e.g., as determined at S240) and affected nodes. The threat might be associated with, for example, an actuator attack, a controller attack, a monitoring node attack, a plant state attack, spoofing, physical damage, unit availability, a unit trip, a loss of unit life, and/or asset damage requiring at least one new part. According to some embodiments, one or more response actions may be performed when a threat alert signal is transmitted. For example, the system might automatically shut down all or a portion of the industrial asset (e.g., to let the detected potential cyber-attack be further investigated). As other examples, one or more parameters might be automatically modified, a software application might be automatically triggered to capture data and/or isolate possible causes, etc. Note that a thread alert signal might be transmitted via a cloud-based system, such as the PREDIX® field agent system. Note that according to some embodiments, a cloud approach might also be used to archive information and/or to store information about boundaries.

According to some embodiments, the system may further localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal. In the method of FIG. 2, the system may automatically classify an attack as either an "independent attack" (e.g., a new attack unrelated to any prior attack) or a "dependent attack" (e.g., an abnormal status resulting from a previously detected attack).

Some embodiments described herein may take advantage of the physics of an industrial asset by learning a priori from tuned high fidelity equipment models and/or actual "on the job" data to detect single or multiple simultaneous adversarial threats to the system. Moreover, according to some embodiments, all monitoring node data may be converted to features using advanced feature-based methods, and the real-time operation of the industrial asset may be monitoring in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the industrial asset to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiment ("DoE") techniques. Moreover, multiple algorithmic methods (e.g., support vector machines, one of the machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Thus, some embodiments may provide an advanced anomaly detection algorithm to detect cyber-attacks on, for example, key gas turbine control sensors. The algorithm may identify which signals(s) are being attacked using control signal-specific decision boundaries and may inform an industrial asset to take accommodative actions. In particular, a detection and localization algorithm might detect whether a sensor, auxiliary equipment input signal, control intermediary parameter, or control logical are in a normal or anomalous state. Some examples of gas turbine monitoring nodes that might be analyzed include: critical control sensors (e.g., a generator power transducer signal, a gas turbine exhaust temperature thermocouple signal, a gas turbine speed signal, etc.); control system intermediary parameters (e.g., generator power, gas turbine exhaust temperature, compressor discharge pressure, compressor discharge temperature, compressor pressure ratio, fuel flow, compressor inlet temperature, guide vane angle, fuel stroke reference, compressor bleed valve, inlet bleed heat valve, etc.); auxiliary equipment input signals (e.g., signals sent to actuators, motors, pumps, etc.); and/or logical commands to controller.

Some embodiments of the algorithm may utilize feature-based learning techniques based on high fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause of attack is and where it originated from. For example, the algorithm may decide if a signal is anomalous because of a previous signal attack, or if it is instead independently under attack. This may be accomplished, for example, by monitoring the evolution of the features as well as by accounting for time delays between attacks.

Figure 3:
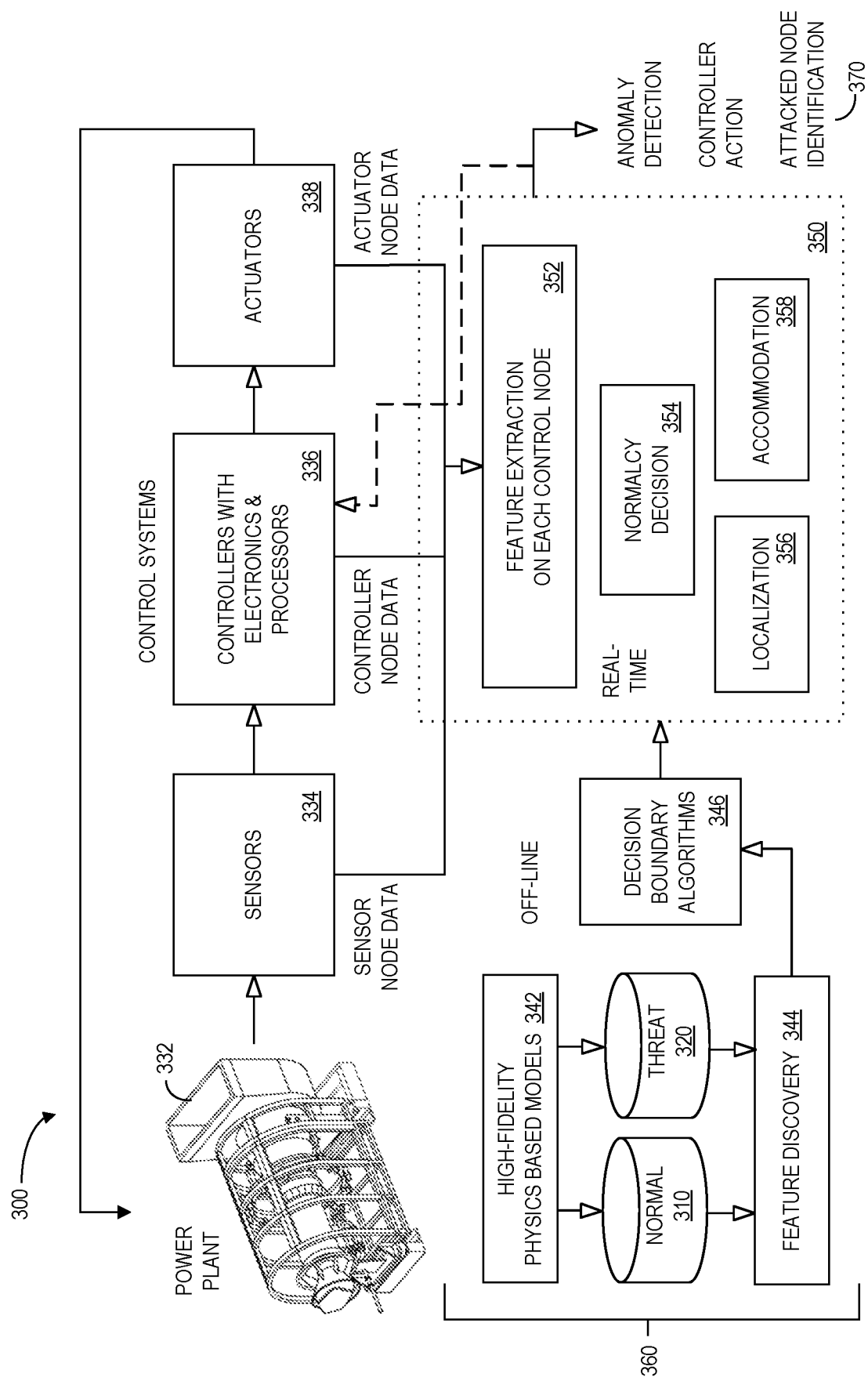
FIG. 3 is threat alert system in accordance with some embodiments.

A cyber-attack detection and localization algorithm may process a real-time turbine signal data stream and then compute features (multiple identifiers) which can then be compared to the sensor specific decision boundary. In some embodiments, generating features may involve simply performing an identity transform. That is, the original signal might be used as it is. A block diagram of a system 300 utilizing a sensor specific gas turbine cyber-attack detection and localization algorithm according to some embodiments is provided in FIG. 3. In particular, a power plant 332 provides information to sensors 334 which helps controllers with electronics and processors 336 adjust actuators 338. A threat detection system 360 may include one or more high-fidelity physics based models 342 associated with the power plant 332 to create normal data 310 and/or threat data 320. The normal data 310 and threat data 320 may be accessed by a feature discovery component 344 and processed by decision boundary algorithms 346 while off-line (e.g., not necessarily while the power plant 332 is operating). The decision boundary algorithms 346 may generate a threat model including decision boundaries for various monitoring nodes. Each decision boundary may separate two data sets in a high dimensional space which is constructed by running a binary classification algorithm, such as a support vector machine using the normal data 310 and threat data 320 for each monitoring node signal (e.g., from the sensors 334, controllers 336, and/or the actuators 338).

A real-time threat detection platform 350 may receive the boundaries along with streams of data from the monitoring nodes. The platform 350 may include a feature extraction on each monitoring node element 352 and a normalcy decision 354 with an algorithm to detect attacks in individual signals using sensor specific decision boundaries, as well rationalize attacks on multiple signals, to declare which signals were attacked, and which became anomalous due to a previous attack on the system via a localization module 356. An accommodation element 358 may generate outputs 370, such as an anomaly decision indication (e.g., threat alert signal), a controller action, and/or a list of attached monitoring nodes.

During real-time detection, contiguous batches of control signal data may be processed by the platform 350, normalized and the feature vector extracted. The location of the vector for each signal in high-dimensional feature space may then be compared to a corresponding decision boundary. If it falls within the attack region, then a cyber-attack may be declared. The algorithm may then make a decision about where the attack originally occurred. An attack may some-times be on the actuators 338 and then manifested in the sensor 334 data. Attack assessments might be performed in a post decision module (e.g., the localization element 356) to isolate whether the attack is related to the sensor, controller, or actuator (e.g., indicating which part of the monitoring node). This may be done by individually monitoring, overtime, the location of the feature vector with respect to the decision boundary. For example, when a sensor 334 is spoofed, the attacked sensor feature vector will cross the decision boundary earlier than the rest of the vectors as described with respect to FIGS. 4 through 6. If a sensor is declared to be anomalous, and the load command to the auxiliary equipment is later determined to be anomalous, it may be determined that the original attack, such as signal spoofing, occurred on the sensor 334. Conversely, if the signal to the auxiliary equipment was determined to be anomalous first, and then later manifested in the sensor 334 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 4:
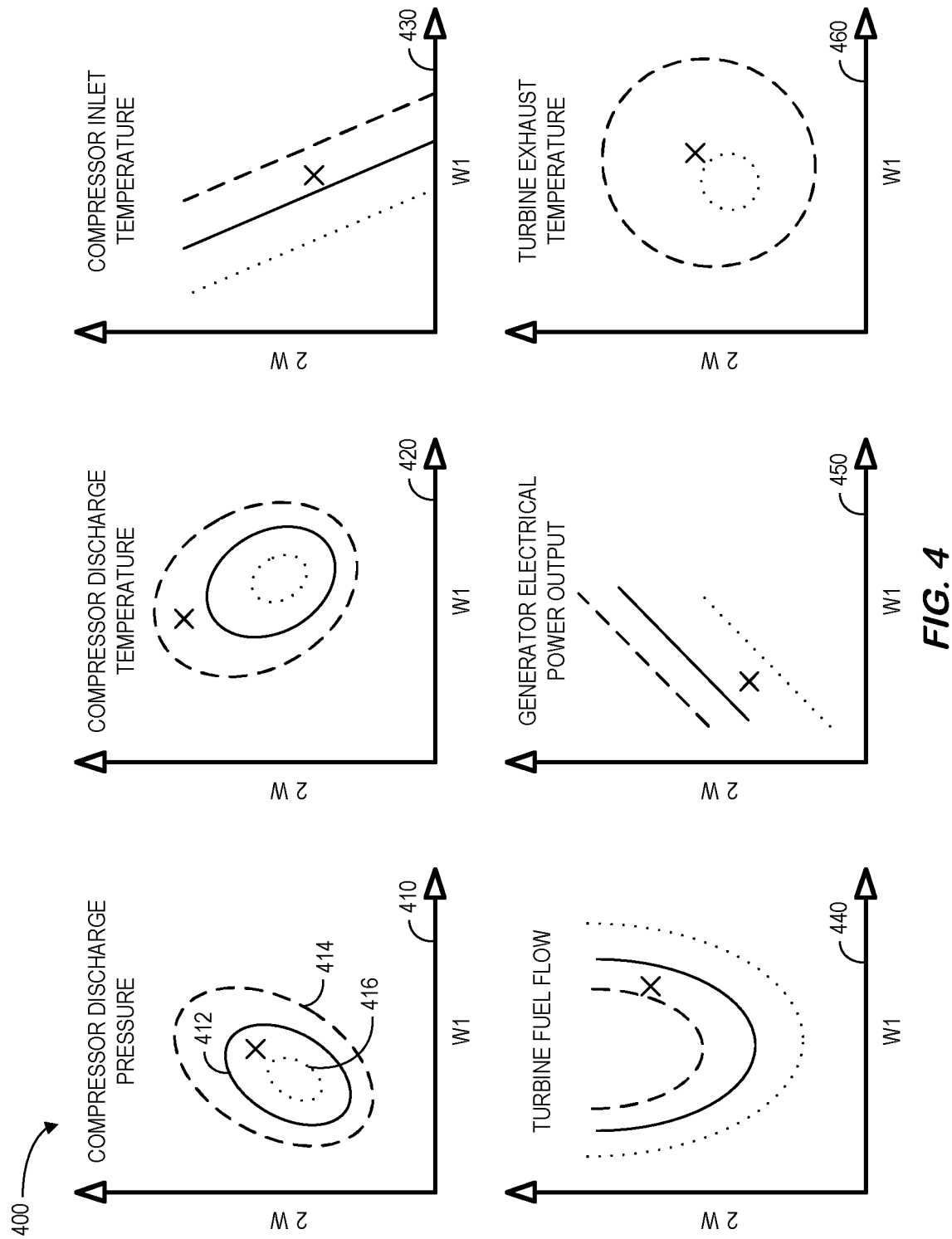
FIGS. 4 through 6 illustrate boundaries and feature vectors for various monitoring node parameters according to some embodiments.

FIG. 4 illustrates 400 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for Compressor Discharge Pressure ("CDP") 410, Compressor Discharge Temperature ("CDT") 420, Compressor Inlet Temperature ("CTIM") 430, Turbine Fuel Flow ("FQG") 440, Generator Electrical Power Output ("DWATT") 450, and Turbine Exhaust Temperature ("TTXM") 460. Note that these features are provided only as examples, and embodiments might be associated with other types of information including information about assets other than a gas turbine. Each graph in FIG. 4 includes an average boundary 412 (solid line), minimum boundary 414 (dotted line), and maximum boundary 416 (dashed line) and an indication associated with current feature location for each monitoring node parameter (illustrated with an "X" on the graph). As illustrated in FIG. 4, the current monitoring node location is between the minimum and maximum boundaries (that is, the "X" is between the dotted and dashed lines). As a result, the system may determine that the operation of the industrial asset is normal (and no threat is being detected indicating that the system is currently under attack).

Figure 5:
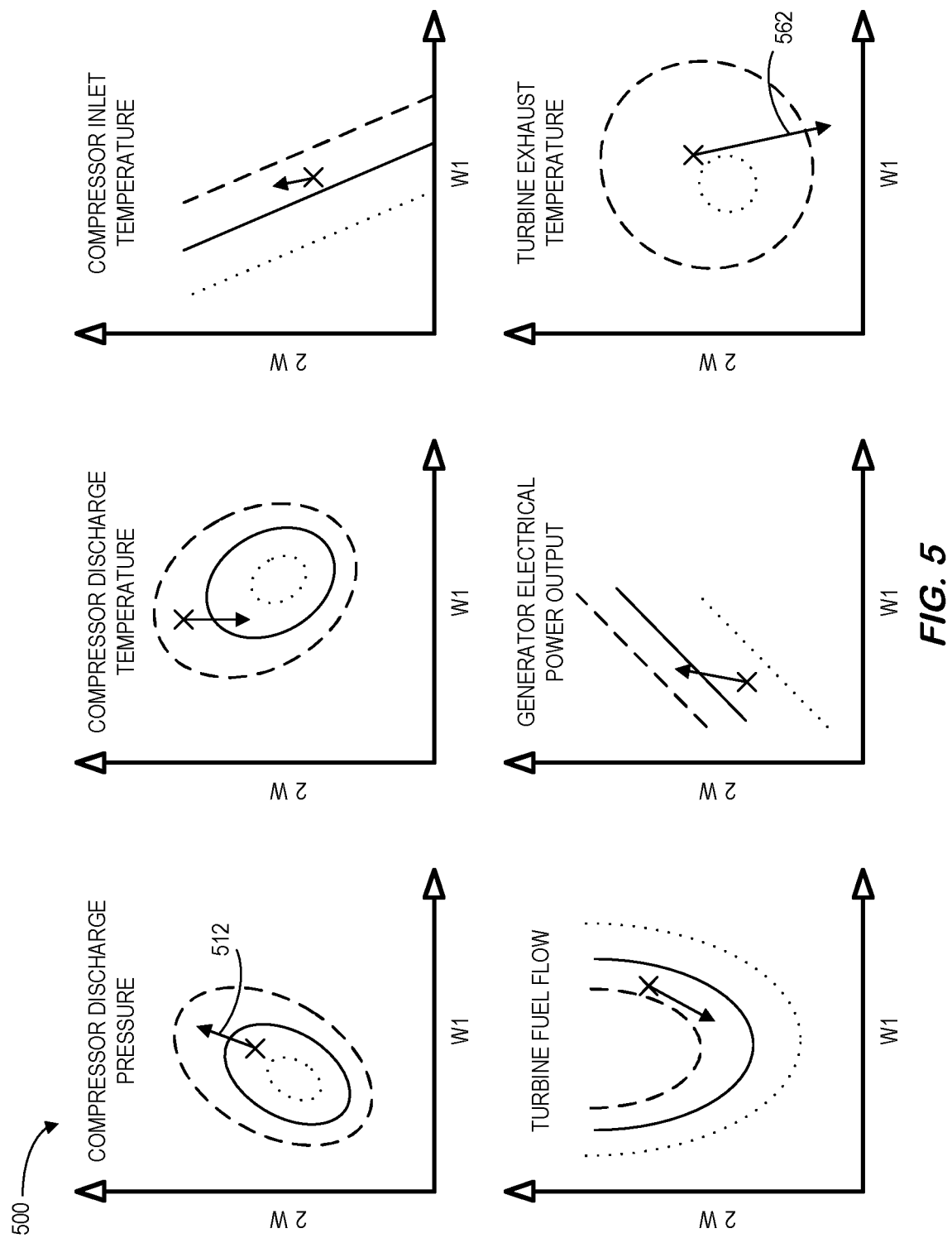

FIG. 5 illustrates 500 subsequent boundaries and feature vectors for these parameters. Consider, for example, a feature vector movement 512 for the compressor discharge pressure. Even though feature vector 512 has moved, it is still within the maximum and minimum boundaries and, as a result, normal operation of that monitoring node may be determined. This is the case for the first five graphs in FIG. 5. In this example, a feature vector movement 562 for the turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary control signal illustrated in FIG. 5 moves 562 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 5, assume that the gas turbine exhaust temperature signal was attacked. This may cause the system to respond in such a way so as to put other signals into an abnormal state. This is illustrated 600 in FIG. 6, where the attack has already been detected and now other signals shown to be abnormal. In particular, feature movement for the compressor discharge pressure 612, compressor discharge temperature 622, compressor inlet temperature 632, and turbine fuel flow 642 have all become abnormal (joining the feature vector for the turbine exhaust temperature 662). Note that the feature vector for generator electrical power output did not become abnormal. In order to decide whether or not these signals 612, 622, 632, 642 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed. According to some embodiments described herein, an automated process might be used to determine if an abnormal condition is associated with an independent or independent attach (e.g., as described in connection with FIGS. 11 and 12).

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to FDIA (which itself is very limited). The cyber-attack detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., turbine speed, thermocouple scale factor, etc.). Full factorial, Taguchi screening, central composite and Box-Behnken are some of the known design methodologies used to create the attack space. When models are not available, these DoE methods are also used to collect data from real-world power generator systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 6:
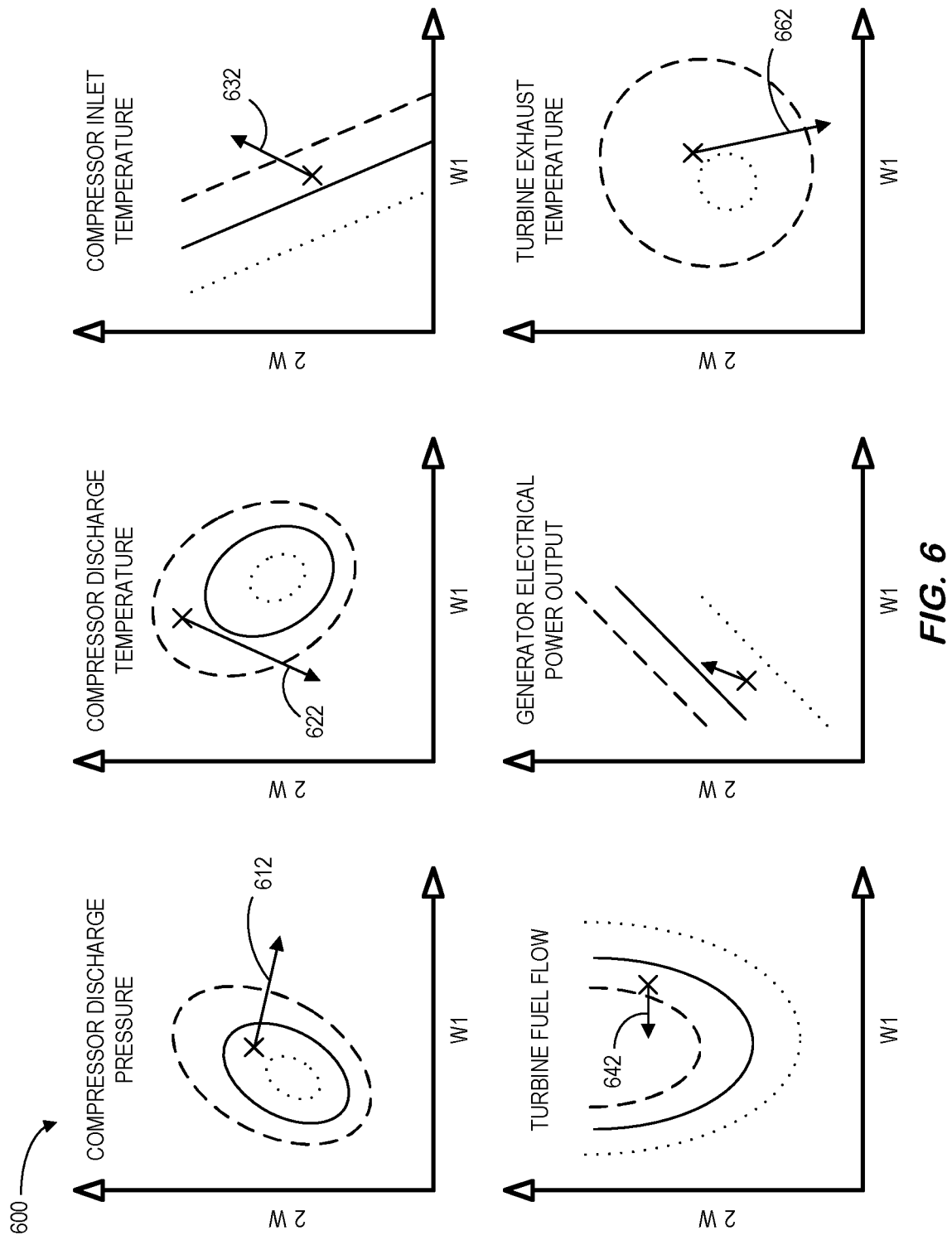

In some cases, multiple vector properties might be examined, and the information described with respect to FIGS. 4 through 6 may be processed to determine if the signal had been trending in a specific direction as the attack was detected (or if it had just been moving due to noise). Had the signal been uniformly trending as the attack took place and afterward, then this signal is a response to the original attack and not an independent attack.

Figure 7:
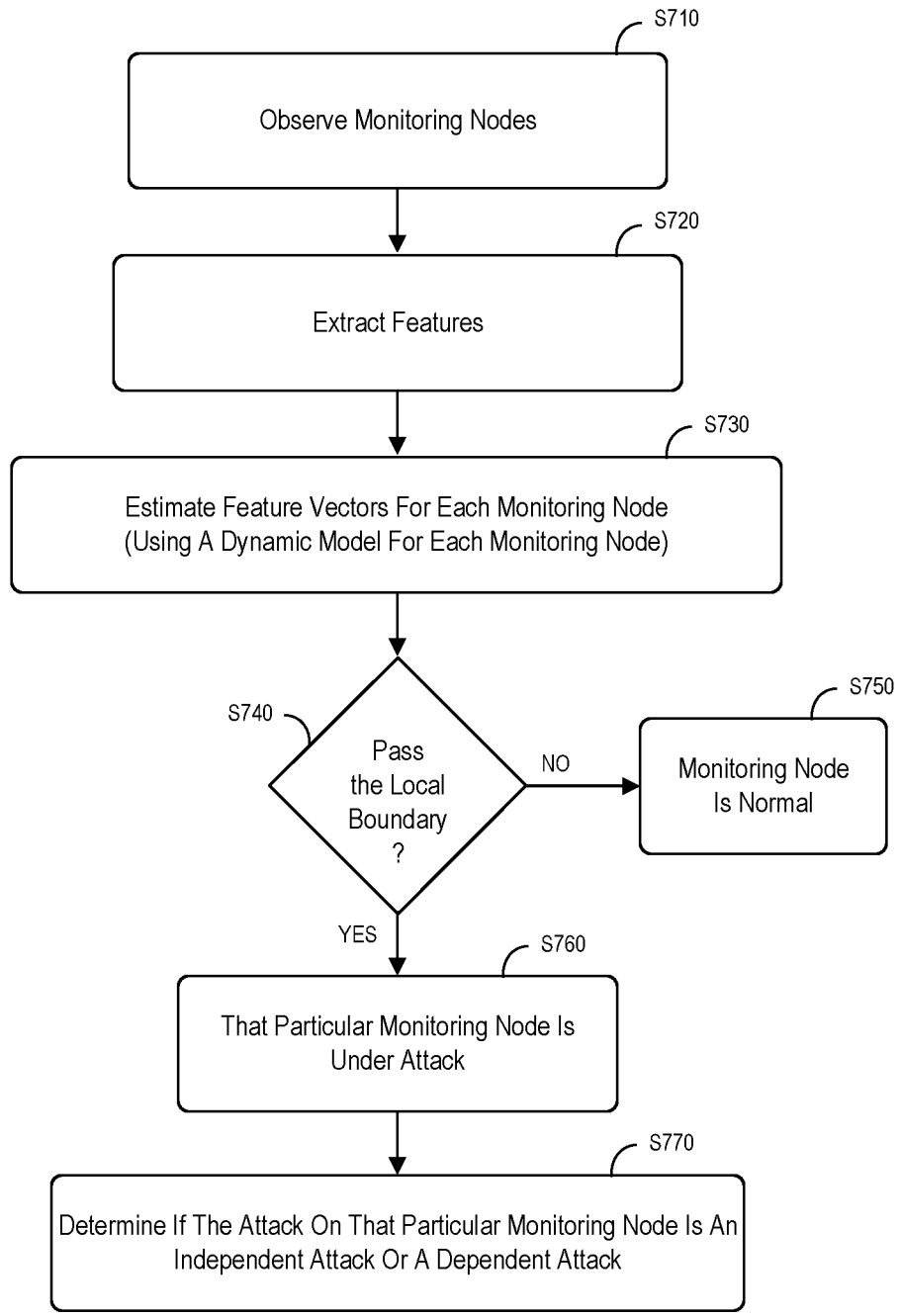
FIG. 7 is a method that might be associated with an on-line operational process in accordance with some embodiments.

FIG. 7 is a method that might be associated with an on-line operational process in accordance with some embodiments. After observing the monitoring nodes at S710, the features are extracted at S720 from each observation of each monitoring node. Then using the dynamic models identified in a training phase, each model then generates filtered or estimated features at S730 using stochastic estimation techniques, such as Kalman filtering. In some embodiments, dynamic models may not be required to further filter or estimate features. The covariance matrix of the process noise needed for the stochastic estimator is readily available here as Q, which can be computed during training phase as the covariance of the error term e(t). Then the output of each stochastic estimator is compared against its corresponding local decision boundary at S740, also computed and pre-stored during the training phase. If the local boundary is not passed at S740, the monitoring node is normal at S750. Each monitoring node with an estimated feature that violates the corresponding decision boundary is reported as being under attack at S760.

In the next stage, the system post-processes the localized attack and determines whether the detected attack is an independent attack or it is an artifact of the previous attack through propagation of the effects in the closed-loop feedback control system at S770. This may provide additional information and insight and may be useful when multiple attacks are detected at the same time. Some embodiments described herein may determine if a sensor data being attacked is a result of an attack on another sensor data or an independent attack. This information may be important when designing attack and fault detection and neutralization strategies. Moreover, some embodiments may provide a feature based methodology that enables classification of sensors into dependent or independent groups. It might be based on, for example, a learning approach in which features are extracted from the data during off-line training and on-line classifier is used to return a decision.

Figure 8:
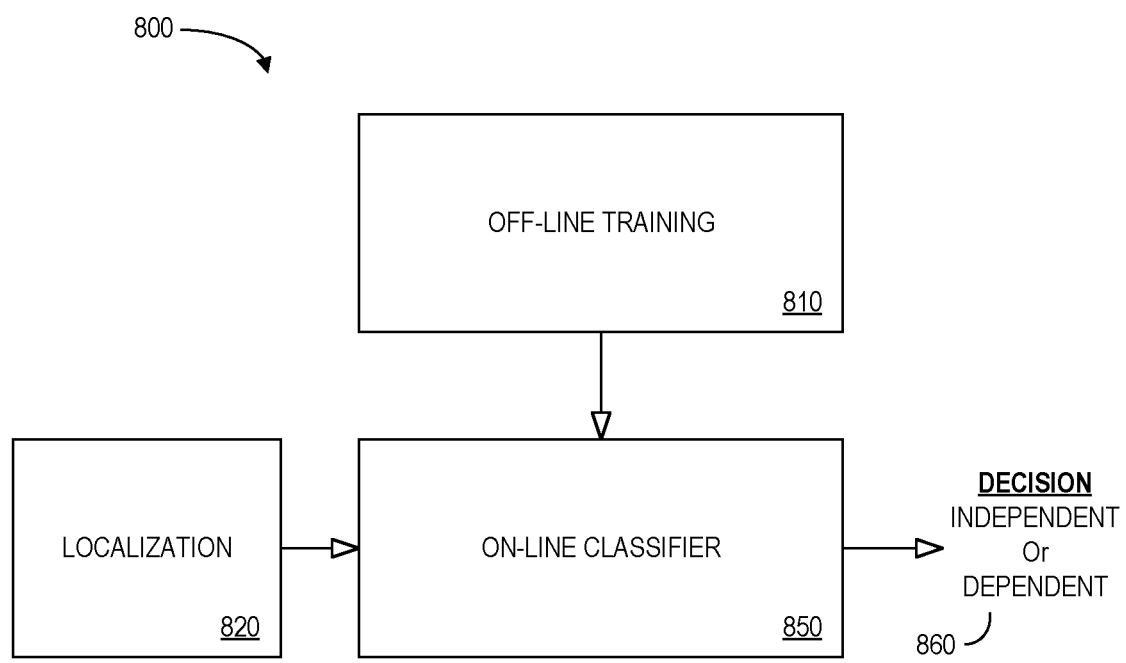
FIG. 8 is a high-level block diagram of an independent/dependent attacked node classifier according to some embodiments.

FIG. 8 is a high-level block diagram 800 of an independent/dependent attacked node on-line classifier 850 according to some embodiments. The on-line classifier 850 receives off-line training 810 and, during operation of the industrial asset, localization data 820 that is used to generate a decision for each attacked node (namely, is the attack associated with an independent threat or a dependent threat?). Note that off-line training 810 might be conducted considering abnormal node measurements. It contains all nodes and they are attacked one at a time independently during different operational conditions. A DoE may also be performed on 2, 3, k multiple independent attack nodes. The off-line training 810 may generate correlation between sensor measurements summarized in a correlation matrix (e.g., a statistically generated heat map), and delays between initial time of attack an initial effect, delays on the rise time between the original attack, and/or delays in settling times.

According to some embodiments, the system 800 includes two different classifiers. The first classifier uses three features that are available as soon as an abnormality occurs and thus provides an instantons preliminary decision. The second classier uses five features and provides a post-partum decision once the incident has reached its settling time or a maximum waiting time (which might be set, for example, by observing the training data) is reached.

Figure 9:
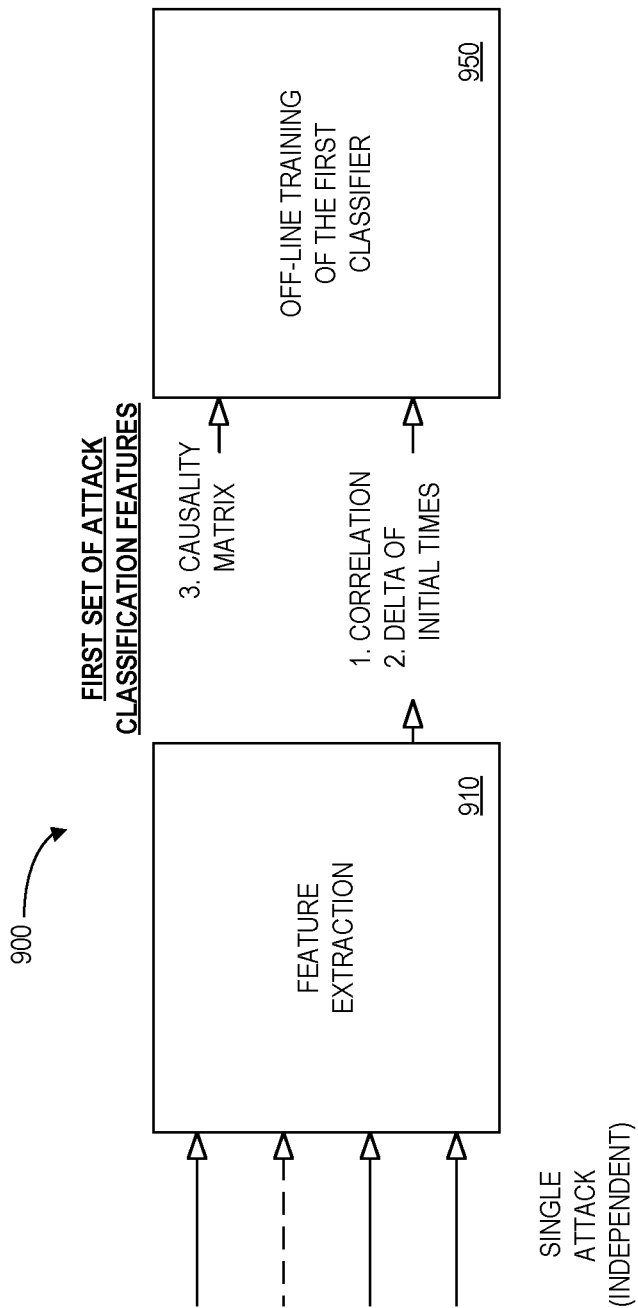
FIG. 9 illustrates off-line training of a classifier associated with a first decision when a single node is being attacked in accordance with some embodiments.
Figure 10:
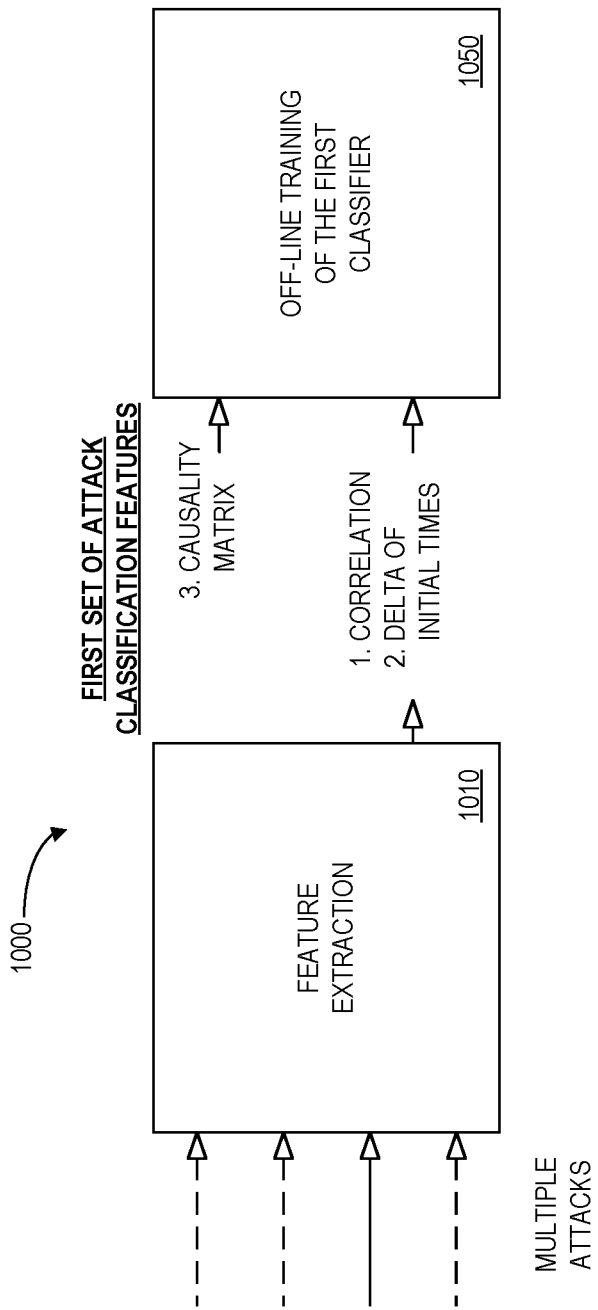
FIG. 10 illustrates off-line training of a classifier associated with a first decision when multiple nodes are being attacked according to some embodiments.

Thus, according to some embodiments, two different types of independent/dependent classification decisions are performed: a "first" classification decision by a first classifier and a "second" classification decision by a second classifier (both of which may be trained off-line). FIG. 9 illustrates 900 off-line training of a first classifier associated with a first decision when a single node is being attacked in accordance with some embodiments. In particular, feature extraction 910 is performed for incoming signals (with an attacked signal being illustrated by a dashed arrow in FIG. 9). A first set of attack classification features is then used for off-line training of a first classifier 950 (e.g., the first set of attack classification features are inputs to the first classifier 950). The first set of attack classification features are: (1) correlation data, (2) a delta of initial times, and (3) a causality matrix. Since there is only one attack in this example, the attack will be always classified as independent (that is, it is not a result of another attack). Similarly, FIG. 10 illustrates 1000 off-line training of a first classifier associated with a first decision when multiple nodes are being attacked according to some embodiments. As before, feature extraction 1010 is performed for incoming signals (with an attacked signal being illustrated by a dashed arrow in FIG. 10). A first set of attack classification features is then used for off-line training of a first classifier 1050. In particular, the first set of attack classification features are: (1) a correlation feature, (2) a delta of initial times feature, and (3) a causality matrix feature.

Figure 11:
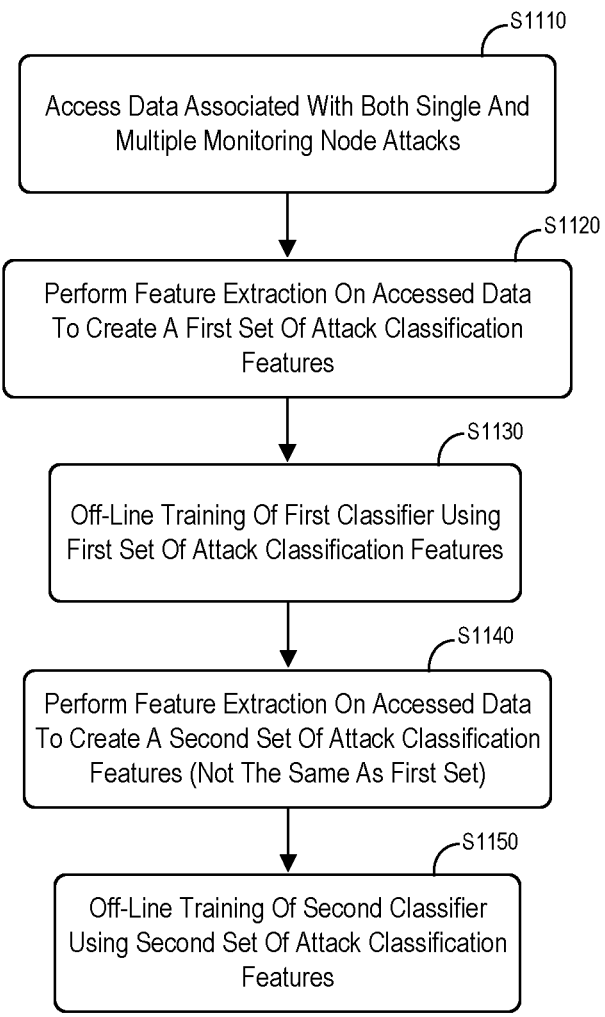
FIG. 11 is a classifier training method in accordance with some embodiments.
Figure 15:
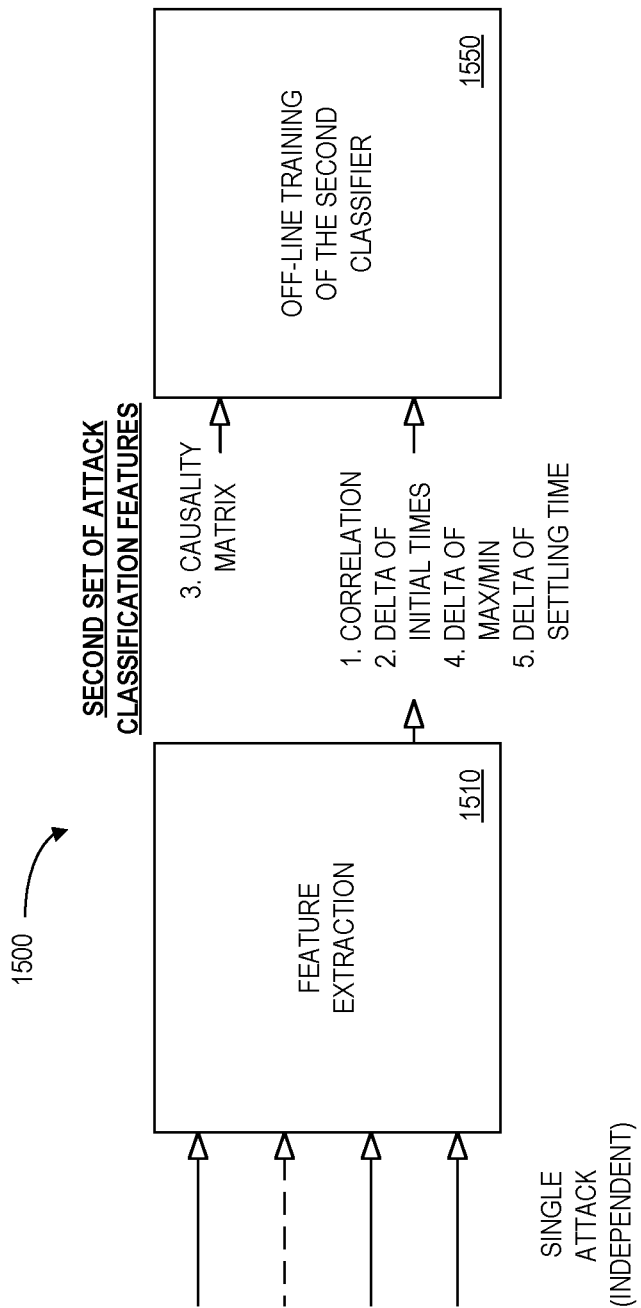
FIG. 15 illustrates off-line training of a classifier associated with a second decision when a single node is being attacked in accordance with some embodiments.
Figure 16:
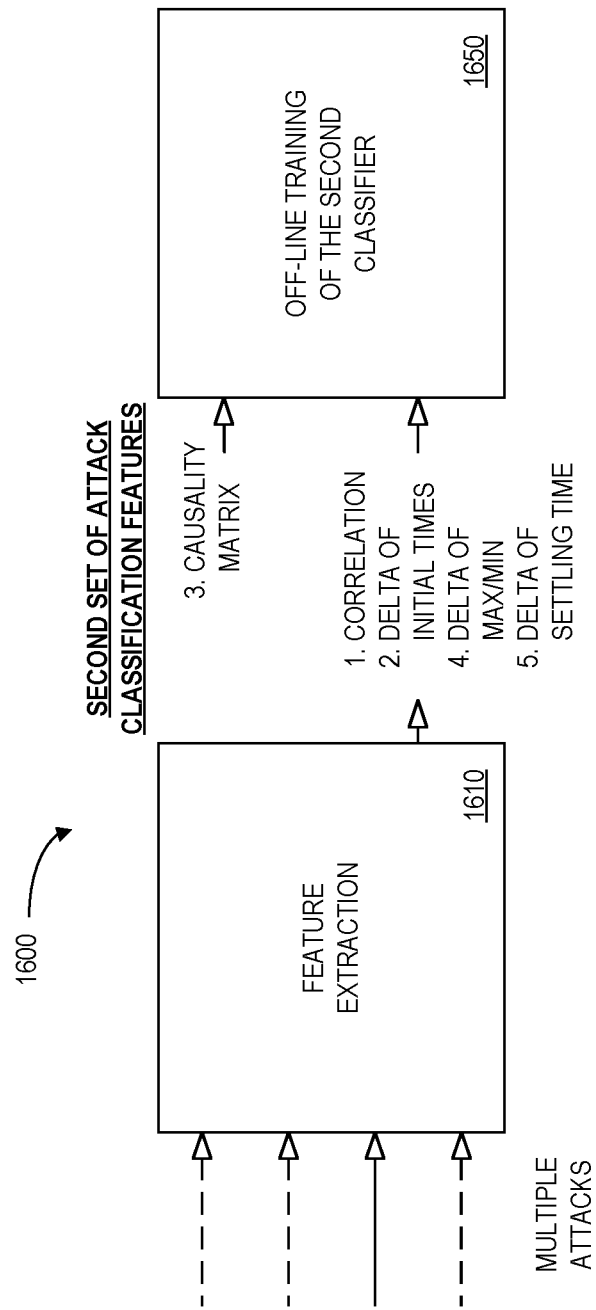
FIG. 16 illustrates off-line training of a classifier associated with a second decision when multiple nodes are being attacked according to some embodiments.

FIG. 11 is a classifier training method in accordance with some embodiments. At S1110, the system may access data associated with single and multiple monitoring node attacks. At S1120, the system may perform feature extraction on the accessed data to create a first set of attack classification features that is used for off-line training of a first classifier at S1130 (associated with a first decision) (e.g., as illustrated in FIGS. 9 and 10). At S1140, the system may perform feature extraction on the accessed data to create a second set of attack classification features (not the same as the first set) that is used for off-line training of a second classifier at S1150 (associated with a second decision) (e.g., as illustrated in FIGS. 15 and 16).

Thus, in some embodiments, a first classifier may comprise a combination of real-values and logic attack classification features:

a correlation between every pair of node time series which is computed over a sliding window and it changes at every sampling time until the settling time;

a delta of initial times which is computed as the second node measurement in the pair arrives; and a causality matrix which is computed offline based on domain knowledge or simulation.

The first classifier is trained considering only three attack classification features: the causality matrix, the correlation, and the delta of initial times. This may give an initial assessment of the attack type for nodes at any sampling time allowing for early warning and early mitigation strategies.

Figure 12:
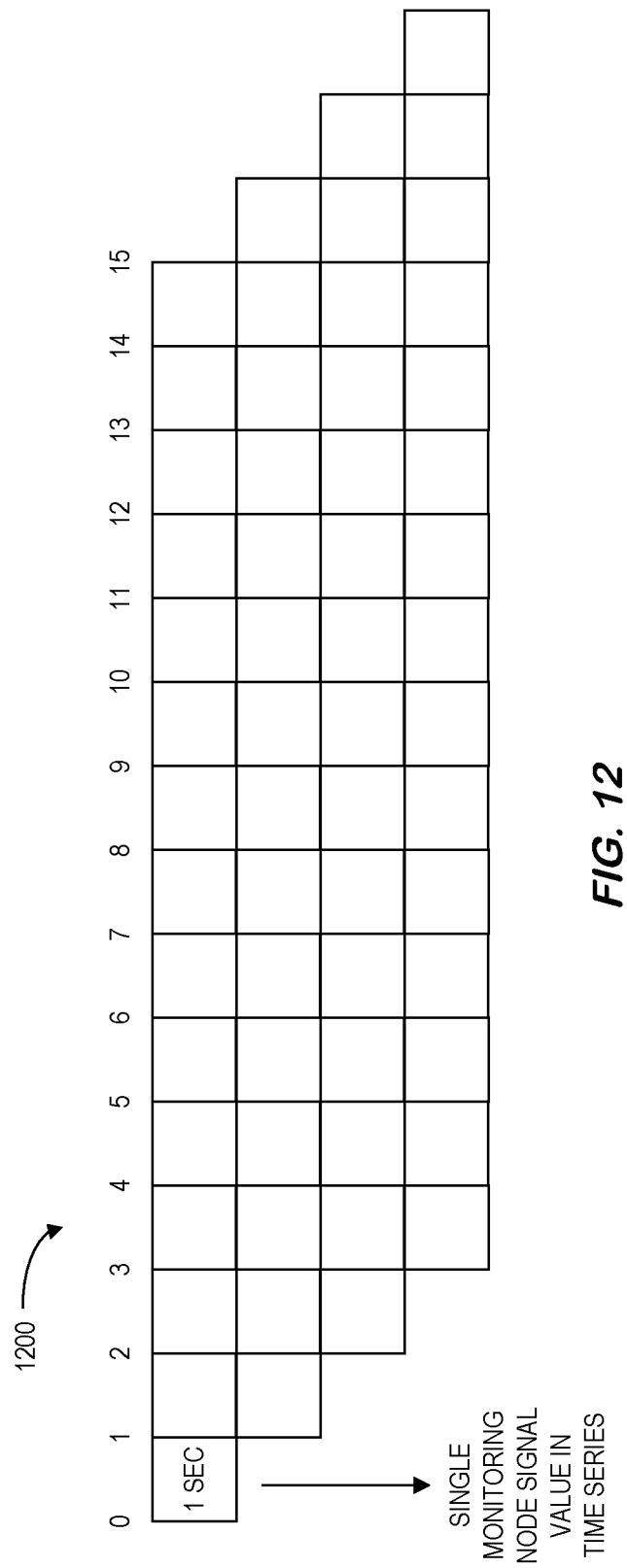
FIG. 12 illustrates a sliding window technique for real-time measurements in accordance with some embodiments.

FIG. 12 illustrates a sliding window 1200 technique for real-time measurements in accordance with some embodiments. In particular, the sliding window 1200 is updated once per second as new input signals are received.

Figure 13:
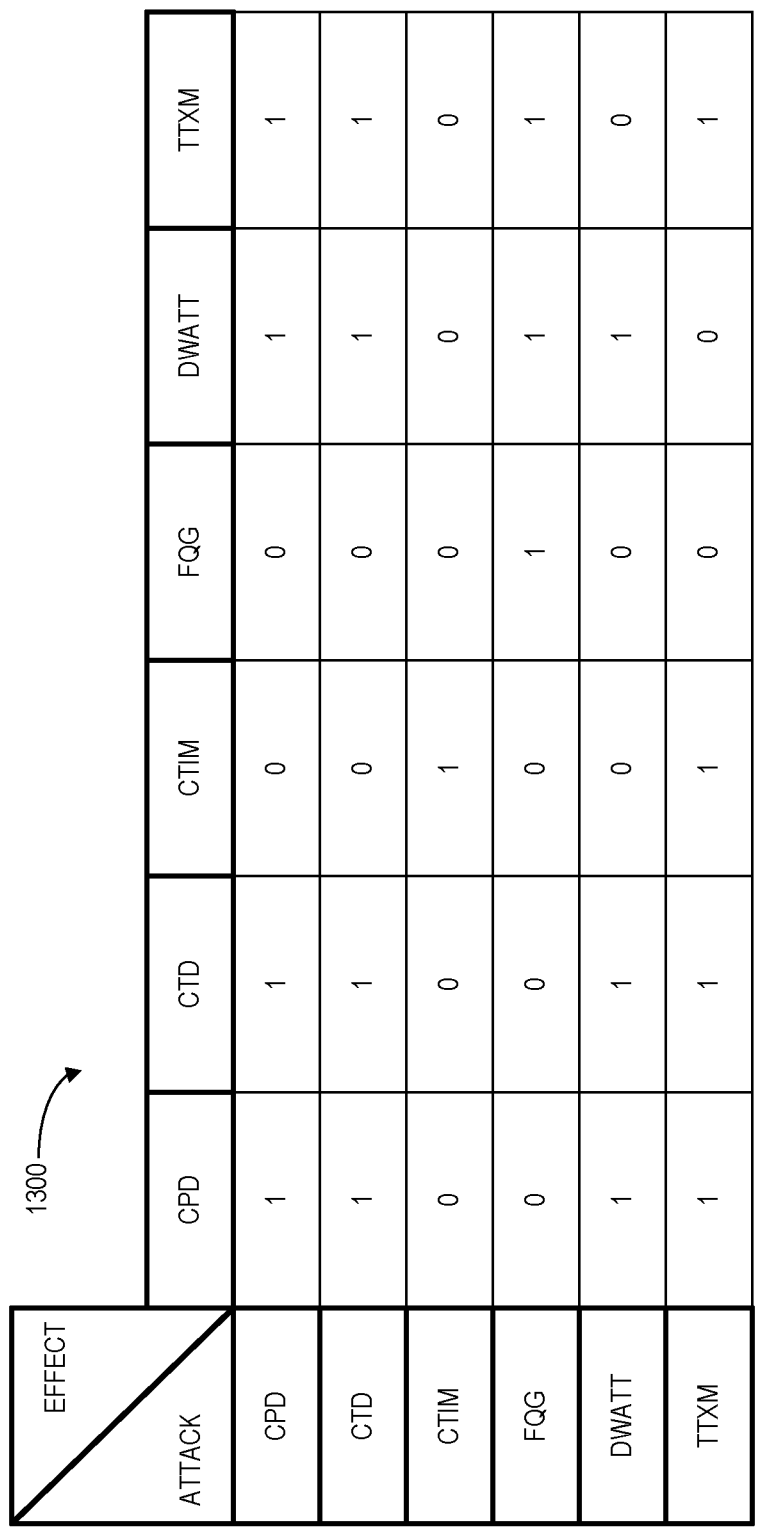
FIG. 13 is a causal dependency matrix of monitoring nodes in accordance with some embodiments.

A causal dependency matrix or causality matrix 1300 according to some embodiments is illustrated in FIG. 13. The matrix 1300 lists each potential attack node and whether or not that node can have an effect on every other node (with a "1" indicating a potential effect and a "0" indicating no potential effect).

Figure 14:
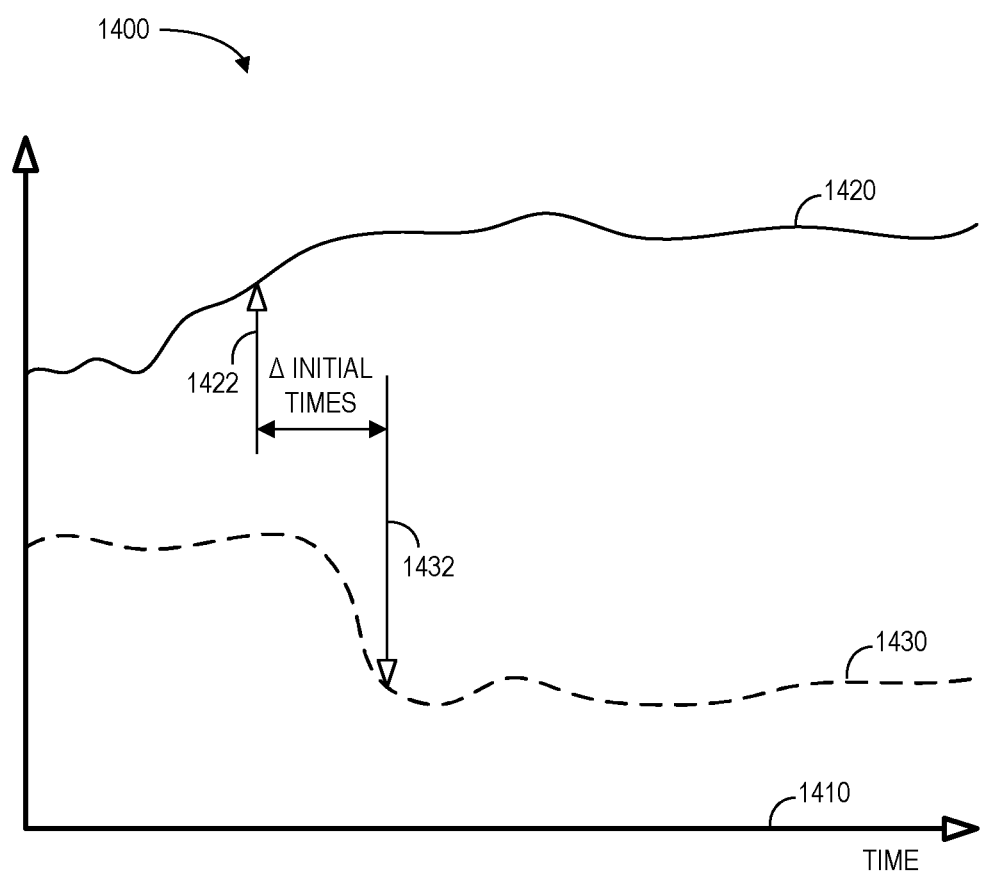
FIG. 14 is a graph illustrating a series of feature values for two different nodes over time according to some embodiments.

FIG. 14 is a graph 1400 including a time axis 1410 illustrating a series of feature values for a feature 1420 of one node and a feature 1430 of another node according to some embodiments. Note that the "features" illustrated in FIG. 14 might represent current raw signal values from the two nodes. In particular, the first feature 1420 crosses an associated decision boundary (and thus becomes abnormal or "attacked") at time $T_{INITIAL1}$ 1422, and the second feature 1430 crosses an associated decision boundary at time $T_{INITIAL2}$ 1432. The difference or "delta" ($\Delta$) between $T_{INITIAL1}$ and $T_{INITIAL2}$ ($T_{INITIAL2}-T_{INITIAL1}$) is referred to herein as the "delta of initial times."

FIG. 15 illustrates 1500 off-line training of a second classifier associated with a second decision when a single node is being attacked in accordance with some embodiments. In particular, feature extraction 1510 is performed for incoming signals (with an attacked signal being illustrated by a dashed arrow in FIG. 15). A second set of attack classification features is then used for off-line training of a second classifier 1550. The second set of attack classification features are: (1) correlation data, (2) a delta of initial times, (3) a causality matrix, (4) a delta of maximum/minimum, and (5) a delta of settling times. Since there is only one attack in this example, the attack will be always classified as independent (that is, it is not a result of another attack). Similarly, FIG. 16 illustrates 1600 off-line training of a second classifier associated with a second decision when multiple nodes are being attacked according to some embodiments. As before, feature extraction 1610 is performed for incoming signals (with an attacked signal being illustrated by a dashed arrow in FIG. 16). A second set of attack classification features is then used for off-line training of a second classifier 1650. In particular, the second set of attack classification features are: (1) a correlation feature, (2) a delta of initial times feature, (3) a causality matrix feature, (4) a delta of maximum/minimum feature, and (5) a delta of settling time feature.

Thus, a second classifier may be trained considering five attack classification features for continuous decisions. Namely the same three attack classification features described in connection with the first classifier along with two new attack classification features:

a delta of minimum/maximum (a rise time) which is computed from transient signals at the settling time, and a delta of settling times which is computed from transient signals at the settling time.

Figure 17:
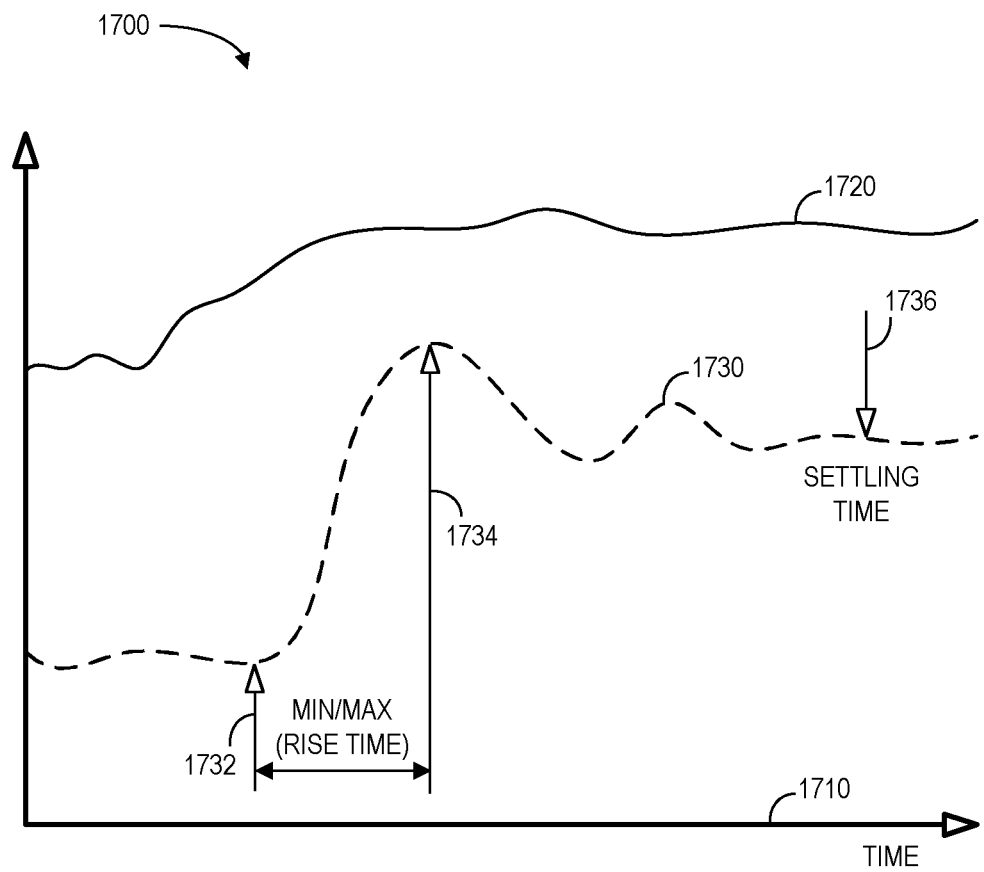
FIG. 17 is another graph illustrating a series of feature values for two different nodes over time according to some embodiments.

FIG. 17 is another graph 1700 with a time axis 1710 illustrating a series of feature values for a feature 1720 of one node and a feature 1730 of another node according to some embodiments. Note that the "features" illustrated in FIG. 17 might represent current raw signal values from the two nodes. As illustrated by the second feature 1730, the difference between the time when a minimum value occurs 1732 and the time when a maximum value occurs 1734 may be referred to as the "minimum/maximum" time or "rise" time. Moreover, the time at which a feature substantially stops fluctuating or oscillating 1736 may be referred to as a "settling" time.

Figure 18:
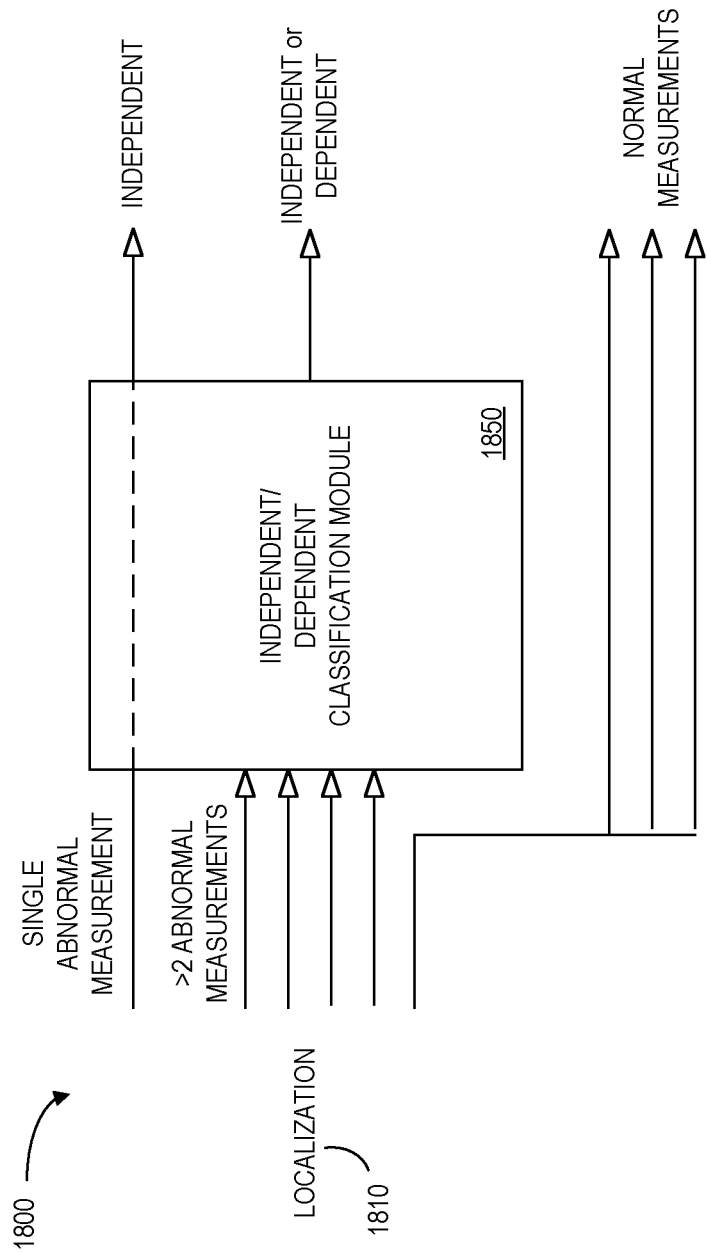
FIG. 18 is a block diagram of on-line operation of a dependent/independent classification system in accordance with some embodiments.

FIG. 18 is a block diagram 1800 of on-line operation of a dependent/independent classification module 1850 in accordance with some embodiments. Note that normal measurements need not pass through the classification module 1850 (that is, they are neither an independent attack nor a dependent attack). When localization 1810 identifies only a single node as being attacked, the module 1850 will classify it as "independent" (that is, the abnormality is not a result of propagation from an attack on another node). When localization 1810 identifies two or more nodes as being attacked, the module 1850 will generate a result for each attacked node indicating whether the attack is independent or dependent.

Note that the classification module 1850 is feature based. Features are measurable indication of how node measurement are related to each other. Node measurements arrive from a localization algorithm, and the measurements that are identified as normal by the localization algorithm do not enter the independent versus dependent classification module 1850. As the first abnormal measurement enters the module 1850, the node is classified as independent. The process for the first decision starts when a second abnormal node measurement arrives. As the sampling time evolves, five different features are calculated and they are used to compute the final decision which is made as the two node measurements reach their settling time.

As another abnormal node measurement arrives, the module 1850 starts making associations with the previous ones and begins to compute the features. Again, at the settling time a final decision on dependency or independency is made.

Further note that attack classification features 1, 2, and 3 are used to make the first decision starting when the second node measurement in the pair arrives until the settling time. The first decision varies at every sampling time. Attack classification features 4 and 5 are added to the attack classification features 1, 2, and 3 to compute the second decision at the settling time.

Figure 19:
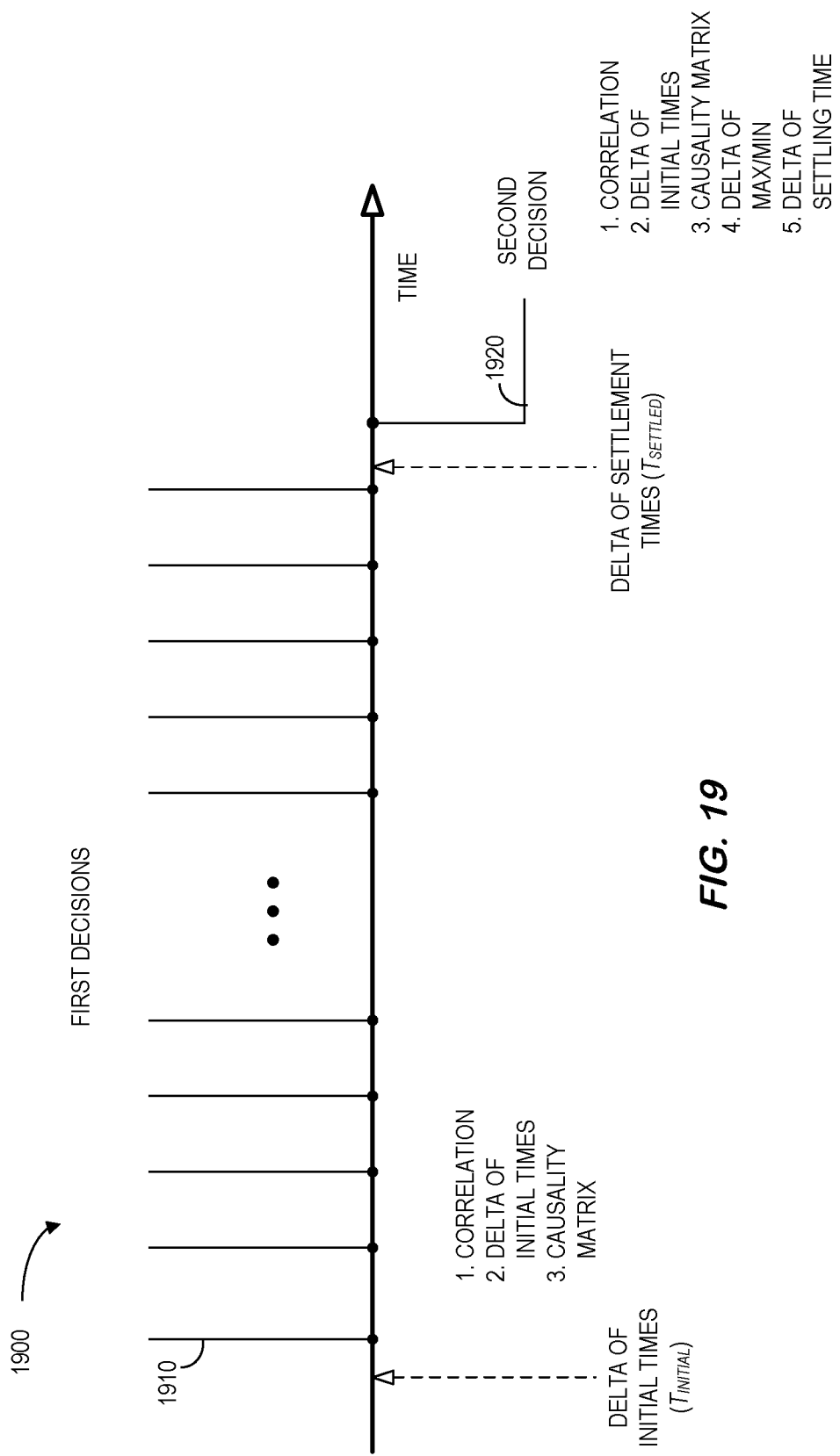
FIG. 19 is a time line of decisions made by a classification module according to some embodiments.

FIG. 19 is a time line 1900 of decisions made by a classification module according to some embodiments. Upon an initial occurrence of a detection of an attack on a monitoring node (when there is at least one other monitoring node already experiencing an attack), the system may generate a first decision 1910 (indicating independent or dependent attack) based on a first set of attack classification features: (1) a correlation feature, (2) a delta of initial times feature, and (3) a causality matrix feature. This first decision 1910 may then be updated repeatedly as new input signals are received. After an abnormality has "settled" (or a maximum amount of time has passed), the system may generate a second decision 1920 based on a second set of attack classification features: (1) correlation data, (2) a delta of initial times, (3) a causality matrix, (4) a delta of maximum/minimum, and (5) a delta of settling times. According to some embodiments, the first decisions and/or the second decision may be used to generate a "final" decision about the attack.

At the settling time, after the two decisions 1910, 1920 have been computed, a weighted mechanism might combine those results. For example, a general final decision might comprise:

$$\max(\text{alpha}*f(P_1(t)), \text{beta}*g(P_2))$$

Moreover, embodiments might take the weighted max of the two probabilities:

$$\max(\text{alpha}*P_1(\text{settling time}), \text{beta}*P_2)$$

Another example would be to average as follows:

$$\frac{1}{(t_{settling} - t_{init})} \int_{t\_init}^{t\_settling} P_1(t)$$

where $P_1$ and $P_2$ are the probabilities associated to the first and second decisions 1910, 1920 respectively. alpha and beta are the weights that represent the importance of each decision 1910, 1920 and can be adjusted on a case-by-case basis. Note that $P_1$ continuously changes until the settling time occurs.

Note that a structure that contains the features 1910, 1920 might be constructed so that features for any pair of nodes can be stored. The vector for each feature is $N^2$ where N is the number of nodes. In total, the feature vector may be $5N^2$. The feature vector might contain data for all nodes. For normal nodes (which might later become abnormal) the feature vector might be initialized as follows: "0" for correlation between every pair of node time series; "−1" for delta of initial times, "value" for causality matrix, "−1" for delta of minimum/maximum (or rise time); and "−1" for delta of settling times.

Further note that two sensors may be considered "independent" if the value of the second sensor does not depend on the value of the first sensor and vice versa. Two sensors are "dependent" if the measurement of the second sensor changes according to the value of the first sensor. This can help determine if an attack or fault has originated in one sensor or is the result of the propagation of an attack or fault to another sensor. Also, this information may help to implement targeted neutralization.

Figure 20:
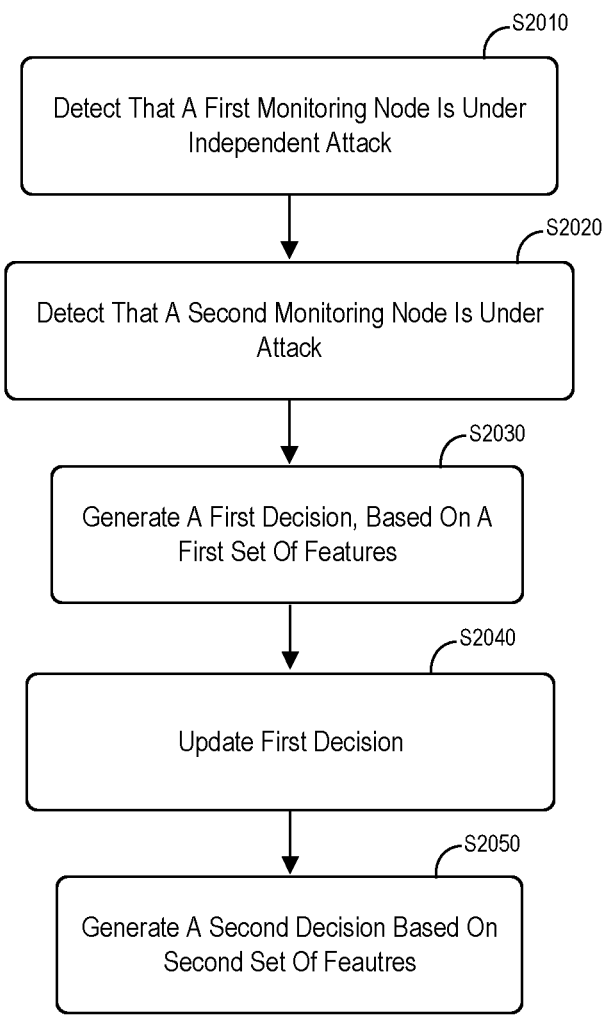
FIG. 20 is an on-line attacked node classification method in accordance with some embodiments.

Embodiments described herein may provide numerous advantages. For example, many current intrusion detection systems or cyber security schemes in general are implemented on large systems where sensor data from tens or even hundreds of sensors is analyzed to infer if an intrusion took place or system failure happened. Sensors can be hardware as in power plants, aircrafts and Heating, Ventilation, and Air Conditioning ("HVAC"), where physical quantities are registered, or they can be software, as in computer systems or social networks FIG. 20 is an on-line attacked node classification method in accordance with some embodiments. At S2010, the system may detect that a first monitoring node is under attack (and, since no other monitoring nodes are under attack, the attack on the first monitoring node is independent). S2020, the system may detect that a second monitoring node is under attack. The system may then generate a first decision based on a first set of attack classification features at S2030 and update the first decision at S2040 as new input signals are received. At S2050, when a final time is reached the system may generate a second decision based on a second set of attack classification features (different than the first set of attack classification features).

Figure 21:
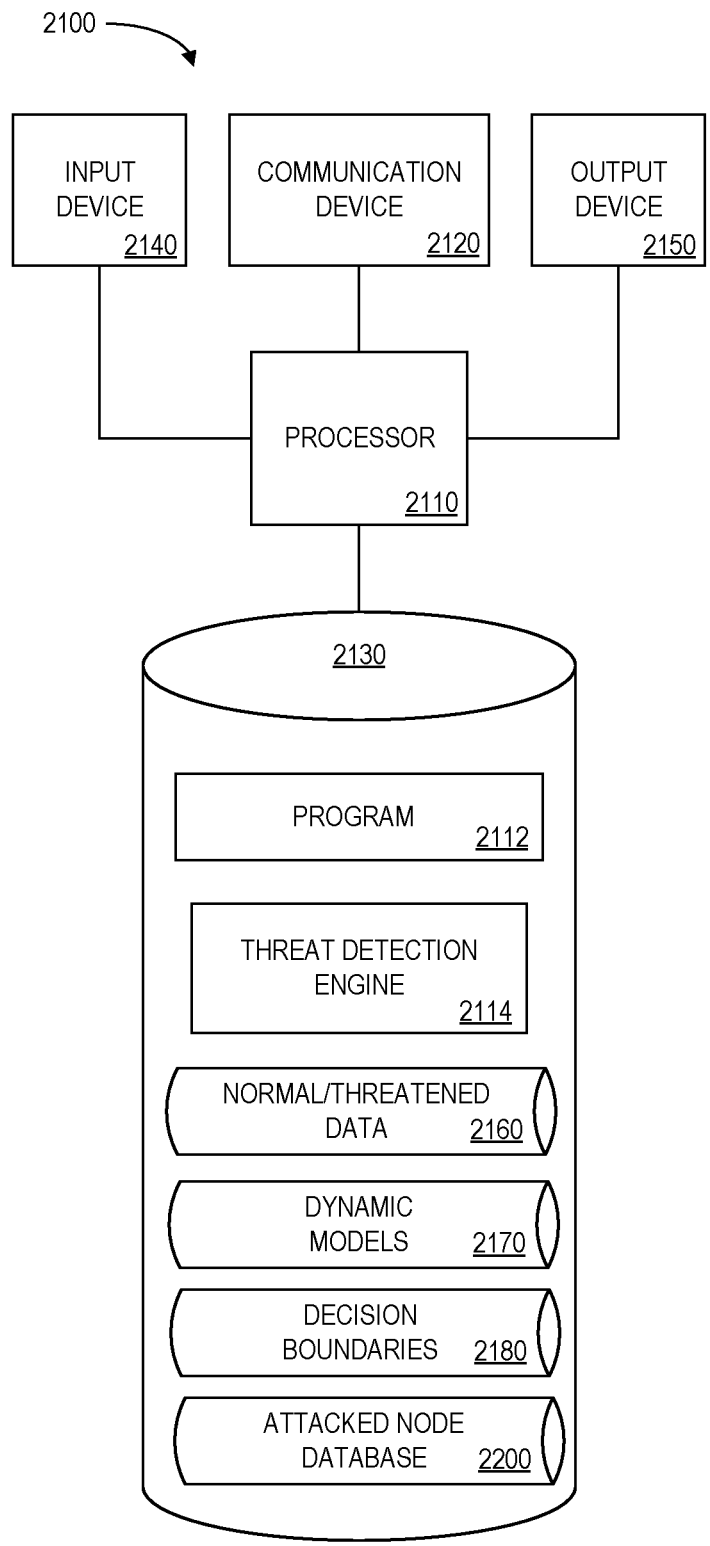
FIG. 21 is a block diagram of an industrial asset protection platform according to some embodiments of the present invention.

The embodiments described herein may be implemented using any number of different hardware configurations. For example, FIG. 21 is a block diagram of an industrial asset protection platform 2100 that may be, for example, associated with the system 210 of FIG. 1. The industrial asset protection platform 2100 comprises a processor 2110, such as one or more commercially available Central Processing Units ("CPUs") in the form of one-chip microprocessors, coupled to a communication device 2120 configured to communicate via a communication network (not shown in FIG. 21). The communication device 2120 may be used to communicate, for example, with one or more remote monitoring nodes, user platforms, etc. The industrial asset protection platform 2100 further includes an input device 2140 (e.g., a computer mouse and/or keyboard to input causal data, propagation data, time window data, etc.) and/an output device 2150 (e.g., a computer monitor to render a display, provide alerts, transmit recommendations, and/or create reports). According to some embodiments, a mobile device, monitoring physical system, and/or PC may be used to exchange information with the industrial asset protection platform 2100.

The processor 2110 also communicates with a storage device 2130. The storage device 2130 may comprise any appropriate information storage device, including combinations of magnetic storage devices (e.g., a hard disk drive), optical storage devices, mobile telephones, and/or semiconductor memory devices. The storage device 2130 stores a program 2112 and/or a threat detection engine 2114 for controlling the processor 2110. The processor 2110 performs instructions of the programs 2112, 2114, and thereby operates in accordance with any of the embodiments described herein. For example, the processor 2110 may receive a plurality of real-time monitoring node signal values over time that represent a current operation of the industrial asset control system. For each stream of monitoring node signal values, the processor 2110 may generate a current monitoring node feature vector. According to some embodiments, the processor 2110 may compare each feature vector with a corresponding decision boundary separating normal from abnormal states. When a first monitoring node passes a corresponding decision boundary, an attack is detected and the processor 2110 may classify it as an independent attack. When a second monitoring node passes a decision boundary, an attack is detected and a first decision is generated by the processor 2110 based on a first set of inputs indicating if the attack is independent/dependent. From the beginning of the attack on the second monitoring node until a final time, the processor 2110 may update the first decision as new signal values are received for the second monitoring node. When the final time is reached, a second decision is generated by the processor 2110 based on a second set of inputs indicating if the attack is independent/dependent.

The programs 2112, 2114 may be stored in a compressed, uncompiled and/or encrypted format. The programs 2112, 2114 may furthermore include other program elements, such as an operating system, clipboard application, a database management system, and/or device drivers used by the processor 2110 to interface with peripheral devices.

As used herein, information may be "received" by or "transmitted" to, for example: (i) the industrial asset protection platform 2100 from another device; or (ii) a software application or module within the industrial asset protection platform 2100 from another software application, module, or any other source.

In some embodiments (such as the one shown in FIG. 21), the storage device 2130 further stores normal/threatened data 2160, dynamic models 2170, decision boundaries 2180, and/or an attacked node database 2200. An example of a database that may be used in connection with the industrial asset control system protection platform 2100 will now be described in detail with respect to FIG. 22. Note that the database described herein is only one example, and additional and/or different information may be stored therein. Moreover, various databases might be split or combined in accordance with any of the embodiments described herein.

Figure 22:
FIG. 22 is a tabular portion of an attacked node database in accordance with some embodiments.

Referring to FIG. 22, a table is shown that represents the attacked node database 2200 that may be stored at the industrial asset protection platform 2100 according to some embodiments. The table may include, for example, entries identifying attacked monitoring associated with an industrial asset. The table may also define fields 2202, 2204, 2206, 2208, 2210, 2212 for each of the entries. The fields 2202, 2204, 2206, 2208, 2210, 2212 may, according to some embodiments, specify: a monitoring node identifier 2202, a time series of feature values 2204, an attack indication 2206, a series of first decisions 2208, a second decision 2210, and a final decision 2212. The attacked node database 2200 may be created and updated, for example, as current time series of feature values 2204 are received and analyzed during normal operation of the industrial asset.

The monitoring node identifier 2202 may be, for example, a unique alphanumeric code identifying a node to be monitored (e.g., associated with a sensor). The time series of feature values 2204 may be associated with input signals associated with that monitoring node (e.g., reflecting temperatures, flow rates, power, etc.). The attack indication 2206 might indicate whether or not that particular node is being attacked (e.g., based on a decision boundary). The series of first decisions 2208 may reflect whether or not the attack is independent based on a first set of attack classification features, and the second decision 2210 might indicate if the attack is independent based on a second set of attack classification features. According to some embodiments, the series of first decisions 2208 and the second decision 2210 might be combined in any of the ways described herein to create the final decision 2212.

Thus, embodiments may enable the automatic detection and localization of indications of abnormal operations using real-time signals from monitoring nodes. Moreover, the detection framework may allow for the development of tools that facilitate proliferation of the invention to various systems (i.e., gas turbines, steam turbines, wind turbines, aviation engines, locomotive engines, power grid, etc.) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to industrial asset operators so that an attack may be thwarted (or the effects of the attack may be blunted), reducing damage to equipment.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 23:
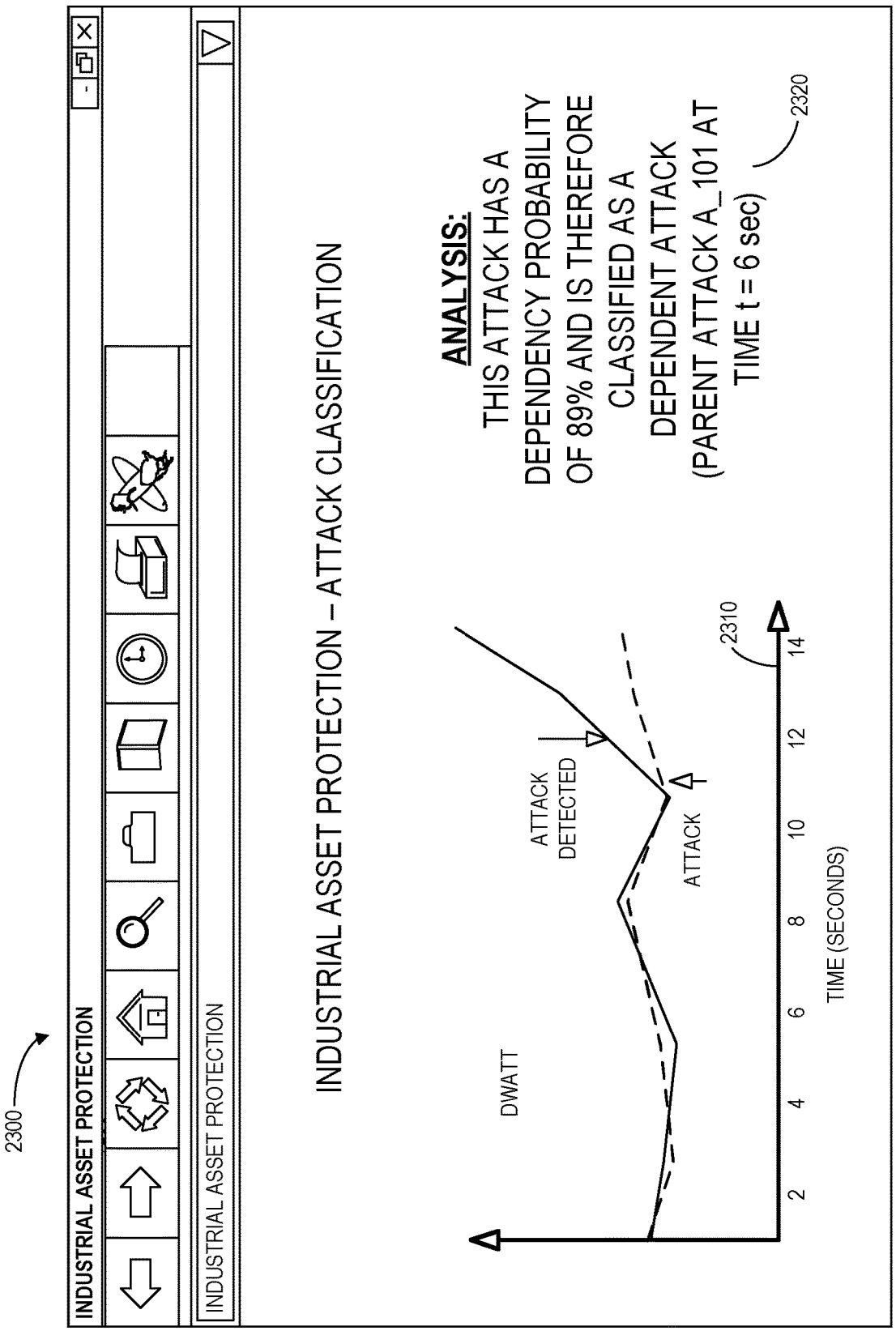
FIG. 23 is a display and/or user interface in accordance with some embodiments.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as damns, the power grid, military devices, etc. Moreover, note that some embodiments may be associated with a display of monitoring node threat data to an operator. For example, FIG. 23 illustrates an interactive Graphical User Interface ("GUI") display 2300 that might display monitoring node information (e.g., including actual and estimated time series of feature values 2310 along and an attack detection indication) along with an automatically generated analysis 2320 of the data. According to some embodiments, information about attack statuses may be interwoven between different industrial asset plants. For example, one power plant might be aware of the status of other nodes (in other power plants) and such an approach might help thwart coordinated cyber-threats.

In addition to automatic threat detection, some embodiments described herein might provide systems with an additional cyber layer of defense and be deployable without custom programming (e.g., when using operating data). Some embodiments may be sold with a license key and could be incorporated as monitoring service. For example, boundaries might be periodically updated when equipment at an industrial asset plant is upgraded.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
   a plurality of real-time monitoring node signal inputs to receive streams of monitoring node signal values over time that represent a current operation of the industrial asset; and
   a threat detection computer platform, coupled to the plurality of real-time monitoring node signal inputs, including:
   a computer hardware processor, and
   a computer memory, coupled to the computer hardware processor, storing instructions that when executed by the computer hardware processor cause the threat detection computer platform to:
   (i) receive the streams of monitoring node signal values,
   (ii) for each stream of monitoring node signal values, generate a current monitoring node feature vector,
   (iii) compare each feature vector with a corresponding decision boundary for that monitoring node, the decision boundary separating a normal state from an abnormal state for that monitoring node, (iv) detect that a first monitoring node has passed a corresponding decision boundary and classify the first monitoring node as being under independent attack, (v) detect that a second monitoring node has passed the corresponding decision boundary and classify the second monitoring node as being under attack, (vi) automatically generate a first decision, based on correlation data, a first delta of initial times, and a causality matrix, to indicate that the attack on the second monitoring node is an independent attack or a dependent attack, (vii) from the beginning of the attack on the second monitoring node until a final time is reached, update the first decision as new signal values are received for the second monitoring node, (viii) when the final time is reached, automatically generate a second decision, based on correlation data, a second of initial times, the causality matrix, a delta of minimum and maximum times, and a delta of settling times, to indicate that the attack on the second monitoring node is an independent attack or dependent attack, and (ix) output information associated with at least one of the first and second decisions.

2. The system of claim 1, wherein the first decision is generated by a first classifier trained off-line.

3. The system of claim 2, wherein the second decision is generated by a second classifier trained off-line.

4. The system of claim 1, wherein the correlation data feature is associated with correlations between every pair of node time series computed over a sliding window that changes every sampling time until the final time is reached.

5. The system of claim 1, wherein the final time is associated with at least one of: (i) a settling time, and (ii) a maximum time.

6. The system of claim 1, wherein the information associated with at least one of the first and second decisions output by the threat detection computer platform is utilized by at least one of: (i) an early warning system, (ii) an early mitigation strategy, (iii) a virtual sensor, and (iv) an adaptive protection unit.

7. The system of claim 1, wherein the information associated with at least one of the first and second decisions output by the threat detection computer platform includes a final decision associated with:

$$\max(\text{alpha}*f(P_1(t)), \text{beta}*g(P_2))$$

where $P_1$ is a probability associated with the first decisions, $P_2$ is a probability associated with the second decision, and alpha and beta are the weights that represent the importance of the first and second decisions, respectively.

8. The system of claim 7, wherein the final decision is further associated with a weighted max of the two probabilities:

$$\max(\text{alpha}*P_1(\text{settling time}), \text{beta}*P_2).$$

9. The system of claim 7, wherein the final decision is further associated with an average:

$$\frac{1}{(t_{settling} - t_{init})} \int_{t\_init}^{t\_settling} P_1(t)$$

where $P_1$ is continuously changing until settling time $t_{settling}$.

10. The system of claim 1, further comprising:
a training normal data set; and
a threat detection model creation computer coupled to the training normal data set and training attack data set, to:
(i) receive information from the training normal data set and extract feature values,
(ii) create a feature time series based on the extracted feature values, and
(iii) perform dynamic system identification in feature space for each monitoring node to generate at least one dynamic model.

11. The system of claim 10, further comprising:
a training attack data set,
wherein the threat detection model creation computer is coupled to the training attack data set and is further adapted to:
(i) receive information from the training normal data set and the training attack data set and extract feature values, and
(ii) create local decision boundaries for each monitoring node based on the extracted feature values.

12. The system of claim 1, wherein at least one monitoring node is associated with a plurality of decision boundaries and said comparison is performed in connection with each of those boundaries.

13. The system of claim 1, wherein a threat alert signal transmission is performed using at least one of: (i) a cloud-based system, (ii) an edge-based system, (iii) a wireless system, (iv) a wired system, (v) a secured network, and (vi) a communication system.

14. A computerized method to protect an industrial asset, comprising:
receiving, at a threat detection computer platform, a plurality of real-time monitoring node signal values over time that represent a current operation of the industrial asset;
for each stream of monitoring node signal values, generating, by the threat detection computer platform, a current monitoring node feature vector;
generating each feature vector with a corresponding decision boundary for that monitoring node, the decision boundary separating a normal state from an abnormal state for that monitoring node;
detecting that a first monitoring node has passed a corresponding decision boundary and classifying the first monitoring node as being under independent attack;
detecting that a second monitoring node has passed the corresponding decision boundary and classifying the second monitoring node as being under attack,
automatically generating a first decision, based on correlation data, a first delta of initial times, and a causality matrix, to indicate that the attack on the second monitoring node is an independent attack or a dependent attack;
from the beginning of the attack on the second monitoring node until a final time is reached, updating the first decision as new signal values are received for the second monitoring node;
when the final time is reached, automatically generating a second decision, based on correlation data, a second of initial times, the causality matrix, a delta of minimum and maximum times, and a delta of settling times, to indicate that the attack on the second monitoring node is an independent attack or dependent attack; and outputting information associated with at least one of the first and second decisions.

15. A non-transient, computer-readable medium storing instructions to be executed by a processor to perform a method of protecting an asset, the method comprising:

receiving, at a threat detection computer platform, a plurality of real-time monitoring node signal values over time that represent a current operation of the industrial asset;

for each stream of monitoring node signal values, generating, by the threat detection computer platform, a current monitoring node feature vector;

generating each feature vector with a corresponding decision boundary for that monitoring node, the decision boundary separating a normal state from an abnormal state for that monitoring node;

detecting that a first monitoring node has passed a corresponding decision boundary and classifying the first monitoring node as being under independent attack;

detecting that a second monitoring node has passed the corresponding decision boundary and classifying the second monitoring node as being under attack, automatically generating a first decision, based on correlation data, a first delta of initial times, and a causality matrix, to indicate that the attack on the second monitoring node is an independent attack or a dependent attack;

from the beginning of the attack on the second monitoring node until a final time is reached, updating the first decision as new signal values are received for the second monitoring node;

when the final time is reached, automatically generating a second decision, based on correlation data, a second of initial times, the causality matrix, a delta of minimum and maximum times, and a delta of settling times, to indicate that the attack on the second monitoring node is an independent attack or dependent attack; and outputting information associated with at least one of the first and second decisions.

* * * * *